US009268020B2

(12) United States Patent
Coleman

(10) Patent No.: US 9,268,020 B2
(45) Date of Patent: Feb. 23, 2016

(54) SONAR ASSEMBLY FOR REDUCED INTERFERENCE

(75) Inventor: Aaron Richard Coleman, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 1042 days.

(21) Appl. No.: 13/370,633

(22) Filed: Feb. 10, 2012

(65) Prior Publication Data

US 2013/0208568 A1 Aug. 15, 2013

(51) Int. Cl.
*G01S 15/89* (2006.01)
*G01S 15/00* (2006.01)
*G01S 7/521* (2006.01)
*G10K 11/00* (2006.01)

(52) U.S. Cl.
CPC .............. *G01S 15/003* (2013.01); *G01S 7/521* (2013.01); *G10K 11/002* (2013.01)

(58) Field of Classification Search
CPC .............. A61N 7/00; G01S 15/00; G01S 9/66
USPC .............. 601/2; 29/25.35; 602/41; 367/88, 7; 73/626
See application file for complete search history.

(56) References Cited

U.S. PATENT DOCUMENTS

| | | |
|---|---|---|
| 1,667,540 A | 4/1928 | Dorsey |
| 1,823,329 A | 9/1931 | Marrison |
| 2,416,338 A | 2/1947 | Mason |
| 3,005,973 A | 10/1961 | Kietz |
| 3,090,030 A | 5/1963 | Schuck |
| 3,142,032 A | 7/1964 | Jones |
| 3,144,631 A | 8/1964 | Lustig et al. |
| 3,296,579 A | 1/1967 | Farr et al. |
| 3,304,532 A | 2/1967 | Nelkin et al. |
| 3,359,537 A | 12/1967 | Geil et al. |
| 3,381,264 A | 4/1968 | Lavergne et al. |
| 3,451,038 A | 6/1969 | Maass |

(Continued)

FOREIGN PATENT DOCUMENTS

| | | |
|---|---|---|
| DE | 1 566 870 A1 | 4/1970 |
| DE | 35 16 698 A1 | 11/1986 |

(Continued)

OTHER PUBLICATIONS

International Search Report and Written Opinion for Application No. PCT/US2012/046062 dated Dec. 14, 2012.

(Continued)

*Primary Examiner* — Luke Ratcliffe
*Assistant Examiner* — Amienatta M Ndure Jobe
(74) *Attorney, Agent, or Firm* — Alston & Bird LLP

(57) ABSTRACT

A sonar transducer assembly includes a housing mountable to a water craft capable of traversing a surface of a body of water. The sonar transducer assembly includes a linear downscan transmit/receive transducer element positioned within the housing, aimed downwardly, and configured to transmit sonar pulses in the form of a fan-shaped beam perpendicular to a plane of the surface of the water, and further configured to receive sonar returns from the sonar pulses and convert sound energy of the sonar returns into downscan sonar return data. The sonar transducer assembly also includes at least one sidescan receive-only transducer element positioned within the housing, aimed outwardly and downwardly, and configured to receive sonar returns from the sonar pulses and convert sound energy of the sonar returns into sidescan sonar return data.

74 Claims, 18 Drawing Sheets

(56) References Cited

U.S. PATENT DOCUMENTS

| | | | |
|---|---|---|---|
| 3,458,854 | A | 7/1969 | Murphree |
| 3,484,737 | A | 12/1969 | Walsh |
| 3,496,524 | A | 2/1970 | Stavis et al. |
| 3,553,638 | A | 1/1971 | Sublett |
| 3,585,578 | A | 6/1971 | Fischer, Jr. |
| 3,585,579 | A * | 6/1971 | Dorr ................. B06B 1/0622 367/153 |
| 3,618,006 | A | 11/1971 | Wright |
| 3,624,596 | A | 11/1971 | Dickenson et al. |
| 3,716,824 | A | 2/1973 | Dorr et al. |
| 3,742,436 | A | 6/1973 | Jones |
| 3,753,219 | A | 8/1973 | King, Jr. |
| 3,757,287 | A | 9/1973 | Bealor, Jr. |
| 3,781,775 | A | 12/1973 | Malloy et al. |
| 3,895,339 | A | 7/1975 | Jones et al. |
| 3,895,340 | A | 7/1975 | Gilmour |
| 3,898,608 | A | 8/1975 | Jones et al. |
| 3,907,239 | A | 9/1975 | Ehrlich |
| 3,922,631 | A | 11/1975 | Thompson et al. |
| 3,949,348 | A | 4/1976 | Dorr |
| 3,950,723 | A | 4/1976 | Gilmour |
| 3,953,828 | A | 4/1976 | Cook |
| 3,964,424 | A | 6/1976 | Hagemann |
| 3,967,234 | A | 6/1976 | Jones |
| 3,975,704 | A | 8/1976 | Klein |
| 4,030,096 | A | 6/1977 | Stevens et al. |
| 4,047,148 | A | 9/1977 | Hagemann |
| 4,052,693 | A | 10/1977 | Gilmour |
| 4,063,212 | A | 12/1977 | Sublett |
| 4,068,209 | A | 1/1978 | Lagier |
| 4,075,599 | A | 2/1978 | Kosalos et al. |
| 4,096,484 | A | 6/1978 | Ferre et al. |
| 4,121,190 | A | 10/1978 | Edgerton et al. |
| 4,180,792 | A * | 12/1979 | Lederman ............. B06B 1/0622 342/380 |
| 4,184,210 | A | 1/1980 | Hagemann |
| 4,195,702 | A | 4/1980 | Denis |
| 4,197,591 | A | 4/1980 | Hagemann |
| 4,198,702 | A | 4/1980 | Clifford |
| 4,199,746 | A | 4/1980 | Jones et al. |
| 4,200,922 | A | 4/1980 | Hagemann |
| 4,204,281 | A | 5/1980 | Hagemann |
| 4,207,620 | A | 6/1980 | Morgera |
| 4,208,738 | A | 6/1980 | Lamborn |
| 4,216,537 | A | 8/1980 | Delignieres |
| 4,232,380 | A | 11/1980 | Caron et al. |
| 4,247,923 | A | 1/1981 | De Kok |
| 4,262,344 | A | 4/1981 | Gilmour |
| 4,287,578 | A | 9/1981 | Heyser |
| 4,347,591 | A | 8/1982 | Stembridge et al. |
| RE31,026 | E | 9/1982 | Shatto |
| 4,400,803 | A | 8/1983 | Spiess et al. |
| 4,413,331 | A | 11/1983 | Rowe, Jr. et al. |
| 4,422,166 | A | 12/1983 | Klein |
| 4,456,210 | A | 6/1984 | McBride |
| 4,458,342 | A * | 7/1984 | Tournois ................. G01S 15/89 342/157 |
| 4,493,064 | A | 1/1985 | Odero et al. |
| 4,496,064 | A | 1/1985 | Beck et al. |
| 4,538,249 | A | 8/1985 | Richard |
| 4,561,076 | A | 12/1985 | Gritsch |
| 4,596,007 | A | 6/1986 | Grall et al. |
| 4,635,240 | A | 1/1987 | Geohegan, Jr. et al. |
| 4,641,290 | A | 2/1987 | Massa et al. |
| 4,642,801 | A | 2/1987 | Perny |
| 4,751,645 | A | 6/1988 | Abrams et al. |
| 4,774,837 | A | 10/1988 | Bird |
| 4,796,238 | A | 1/1989 | Bourgeois et al. |
| 4,802,148 | A | 1/1989 | Gilmour |
| 4,815,045 | A | 3/1989 | Nakamura |
| 4,829,493 | A | 5/1989 | Bailey |
| 4,855,961 | A | 8/1989 | Jaffe et al. |
| 4,879,697 | A | 11/1989 | Lowrance et al. |
| 4,907,208 | A | 3/1990 | Lowrance et al. |
| 4,912,685 | A | 3/1990 | Gilmour |
| 4,924,448 | A | 5/1990 | Gaer |
| 4,935,906 | A | 6/1990 | Baker et al. |
| 4,939,700 | A | 7/1990 | Breton |
| 4,958,330 | A | 9/1990 | Higgins |
| 4,970,700 | A | 11/1990 | Gilmour et al. |
| 4,972,387 | A | 11/1990 | Warner |
| 4,975,887 | A | 12/1990 | Maccabee et al. |
| 4,982,924 | A | 1/1991 | Havins |
| 5,025,423 | A | 6/1991 | Earp |
| 5,033,029 | A | 7/1991 | Jones |
| 5,077,699 | A | 12/1991 | Passamante et al. |
| 5,109,364 | A | 4/1992 | Stiner |
| 5,113,377 | A | 5/1992 | Johnson |
| 5,142,497 | A | 8/1992 | Warrow |
| 5,142,502 | A | 8/1992 | Wilcox et al. |
| D329,615 | S | 9/1992 | Stiner |
| D329,616 | S | 9/1992 | Stiner |
| 5,155,706 | A | 10/1992 | Haley et al. |
| 5,159,226 | A | 10/1992 | Montgomery |
| 5,182,732 | A | 1/1993 | Pichowkin |
| 5,184,330 | A | 2/1993 | Adams et al. |
| 5,191,341 | A | 3/1993 | Gouard et al. |
| 5,200,931 | A | 4/1993 | Kosalos et al. |
| 5,214,744 | A | 5/1993 | Schweizer et al. |
| 5,231,609 | A | 7/1993 | Gaer |
| 5,237,541 | A * | 8/1993 | Woodsum ............... G01S 15/00 367/92 |
| 5,241,314 | A | 8/1993 | Keeler et al. |
| 5,243,567 | A | 9/1993 | Gingerich |
| 5,245,587 | A | 9/1993 | Hutson |
| 5,257,241 | A | 10/1993 | Henderson et al. |
| 5,260,912 | A | 11/1993 | Latham |
| 5,276,453 | A | 1/1994 | Heymsfield et al. |
| 5,297,109 | A | 3/1994 | Barksdale, Jr. et al. |
| 5,299,173 | A | 3/1994 | Ingram |
| 5,303,208 | A | 4/1994 | Dorr |
| 5,376,933 | A | 12/1994 | Tupper et al. |
| 5,390,152 | A | 2/1995 | Boucher et al. |
| 5,412,618 | A | 5/1995 | Gilmour |
| 5,433,202 | A | 7/1995 | Mitchell et al. |
| 5,438,552 | A | 8/1995 | Audi et al. |
| 5,442,358 | A | 8/1995 | Keeler et al. |
| 5,455,806 | A | 10/1995 | Hutson |
| 5,485,432 | A | 1/1996 | Aechter et al. |
| 5,493,619 | A | 2/1996 | Haley et al. |
| 5,515,337 | A | 5/1996 | Gilmour et al. |
| 5,525,081 | A | 6/1996 | Mardesich et al. |
| 5,526,765 | A | 6/1996 | Ahearn |
| 5,537,366 | A | 7/1996 | Gilmour |
| 5,537,380 | A | 7/1996 | Sprankle, Jr. et al. |
| 5,546,356 | A | 8/1996 | Zehner |
| 5,546,362 | A | 8/1996 | Baumann et al. |
| 5,561,641 | A | 10/1996 | Nishimori et al. |
| 5,574,700 | A | 11/1996 | Chapman |
| 5,596,549 | A | 1/1997 | Sheriff |
| 5,596,550 | A | 1/1997 | Rowe, Jr. et al. |
| 5,602,801 | A | 2/1997 | Nussbaum et al. |
| 5,612,928 | A | 3/1997 | Haley et al. |
| 5,623,524 | A | 4/1997 | Weiss et al. |
| 5,675,552 | A | 10/1997 | Hicks et al. |
| 5,694,372 | A | 12/1997 | Perennes |
| 5,790,474 | A | 8/1998 | Feintuch |
| 5,805,525 | A | 9/1998 | Sabol et al. |
| 5,805,528 | A | 9/1998 | Hamada et al. |
| 5,808,967 | A | 9/1998 | Yu et al. |
| 5,838,635 | A | 11/1998 | Masreliez |
| 5,850,372 | A | 12/1998 | Blue |
| 5,930,199 | A | 7/1999 | Wilk |
| 5,991,239 | A | 11/1999 | Fatemi-Booshehri et al. |
| 6,002,644 | A | 12/1999 | Wilk |
| 6,084,827 | A | 7/2000 | Johnson et al. |
| 6,130,641 | A | 10/2000 | Kraeutner et al. |
| 6,215,730 | B1 | 4/2001 | Pinto |
| 6,225,984 | B1 | 5/2001 | Crawford |
| 6,226,227 | B1 | 5/2001 | Lent et al. |
| 6,273,771 | B1 | 8/2001 | Buckley et al. |
| 6,285,628 | B1 | 9/2001 | Kiesel |
| 6,321,158 | B1 | 11/2001 | DeLorme et al. |
| 6,325,020 | B1 | 12/2001 | Guigne et al. |

(56) References Cited

U.S. PATENT DOCUMENTS

| | | |
|---|---|---|
| 6,335,905 B1 | 1/2002 | Kabel |
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 | 9/2002 | Shell |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |
| 6,761,692 B2 | 7/2004 | Angelsen et al. |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,036,451 B1 | 5/2006 | Hutchinson |
| 7,215,599 B2 | 5/2007 | Nishimori et al. |
| 7,236,426 B2 | 6/2007 | Turner et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,305,929 B2 | 12/2007 | MacDonald et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 | 7/2008 | Skjold-Larsen |
| 7,430,461 B1 | 9/2008 | Michaels |
| 7,542,376 B1 | 6/2009 | Thompson et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,019,532 B2 | 9/2011 | Sheha et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,305,841 B2 | 11/2012 | Riordan et al. |
| 8,514,658 B2 | 8/2013 | Maguire |
| 8,605,550 B2 | 12/2013 | Maguire |
| 2001/0026499 A1 | 10/2001 | Inouchi |
| 2002/0035574 A1 | 3/2002 | Dumas |
| 2002/0071029 A1 | 6/2002 | Zell et al. |
| 2002/0085452 A1 | 7/2002 | Scanlon |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1 | 9/2005 | Fisher et al. |
| 2006/0002232 A1 | 1/2006 | Shah et al. |
| 2006/0013066 A1 | 1/2006 | Nishimori et al. |
| 2006/0023570 A1 | 2/2006 | Betts et al. |
| 2006/0119585 A1 | 6/2006 | Skinner |
| 2006/0224940 A1 | 10/2006 | Lee |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2007/0208280 A1* | 9/2007 | Talish ............ A61N 7/00 601/2 |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0080082 A1* | 4/2010 | Betts ............ G01S 7/521 367/88 |
| 2010/0097891 A1 | 4/2010 | Cummings |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2010/0277379 A1 | 11/2010 | Lindackers et al. |
| 2011/0007606 A1 | 1/2011 | Curtis |
| 2011/0012773 A1 | 1/2011 | Cunning et al. |
| 2011/0013484 A1 | 1/2011 | Coleman et al. |
| 2011/0013485 A1* | 1/2011 | Maguire ............ G01S 15/89 367/88 |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1 | 9/2011 | Soni et al. |
| 2012/0001773 A1 | 1/2012 | Lyons et al. |
| 2012/0011437 A1 | 1/2012 | James et al. |
| 2012/0014220 A1 | 1/2012 | Depasqua |
| 2012/0069712 A1 | 3/2012 | Potanin et al. |
| 2012/0106300 A1 | 5/2012 | Maguire |
| 2012/0163126 A1* | 6/2012 | Campbell ............ B06B 1/0614 367/135 |
| 2012/0185801 A1 | 7/2012 | Madonna et al. |
| 2013/0007665 A1 | 1/2013 | Chaudhri et al. |
| 2013/0016588 A1 | 1/2013 | O'Dell |
| 2013/0148471 A1 | 6/2013 | Brown et al. |
| 2013/0208568 A1 | 8/2013 | Coleman |
| 2014/0010048 A1 | 1/2014 | Proctor |
| 2014/0064024 A1 | 3/2014 | Maguire |

FOREIGN PATENT DOCUMENTS

| | | |
|---|---|---|
| EP | 1 272 870 B1 | 4/2004 |
| EP | 1 393 025 B1 | 2/2006 |
| EP | 2 070 068 B1 | 3/2008 |
| EP | 2 023 159 A1 | 2/2009 |
| GB | 823304 A | 11/1959 |
| GB | 1 306 769 A | 2/1973 |
| GB | 1 315 651 A | 5/1973 |
| GB | 1316138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| GB | 2 444 161 A | 5/2008 |
| JP | 50-109389 U | 9/1975 |
| JP | 54-054365 U | 4/1979 |
| JP | 57-046173 A | 3/1982 |
| JP | 58-079178 A | 5/1983 |
| JP | S-59-107285 A | 6/1984 |
| JP | S-61-102574 A | 5/1986 |
| JP | 61-116678 A | 6/1986 |
| JP | S-61-262674 A | 11/1986 |
| JP | 62-099877 U | 6/1987 |
| JP | 62-134084 U | 8/1987 |
| JP | 62-190480 A | 8/1987 |
| JP | 63-261181 A | 10/1988 |
| JP | H02-159591 A | 6/1990 |
| JP | H-03-85476 A | 4/1991 |
| JP | 4-357487 A | 12/1992 |
| JP | 4357487 A | 12/1992 |
| JP | 7-031042 A | 1/1995 |
| JP | 07-270523 A | 10/1995 |
| JP | H-10-123247 A | 5/1998 |

(56) References Cited

FOREIGN PATENT DOCUMENTS

| | | |
|---|---|---|
| JP | H-10-132930 A | 5/1998 |
| JP | 10-186030 A | 7/1998 |
| JP | H-10-325871 A | 12/1998 |
| JP | 2001-074840 A | 3/2001 |
| JP | 2002-168592 A | 6/2002 |
| JP | 2004-020276 A | 1/2004 |
| JP | 2004-219400 A | 8/2004 |
| JP | 2005-091307 A | 4/2005 |
| JP | 2006-064524 A | 3/2006 |
| JP | 2006-162480 A | 6/2006 |
| JP | 2006-208300 A | 8/2006 |
| JP | 2008-508539 | 3/2008 |
| JP | 2008-128900 A | 6/2008 |
| JP | 2009-222414 A | 10/2009 |
| JP | 2010-030340 A | 2/2010 |
| WO | WO 84/01833 A1 | 5/1984 |
| WO | WO-91/02989 A1 | 3/1991 |
| WO | WO 98/15846 | 4/1998 |
| WO | WO 03/009276 A2 | 1/2003 |
| WO | WO-2005/057234 A1 | 6/2005 |
| WO | WO-2008/105932 A2 | 9/2008 |
| WO | WO-2008/152618 A1 | 12/2008 |
| WO | WO 2011/008429 A1 | 1/2011 |

OTHER PUBLICATIONS

Anderson, K.; "Side-Scanning for Sport Fishing"; Salt Water Sportsman; Apr. 1, 2009; 4 pages.
Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.
Armstrong, A.A., et al.; "New Technology for Shallow Water Hydrographic Surveys"; Proceedings of the $25^{th}$ Joint Meeting of UJNR Sea-bottom Surveys Panel; Dec. 1996.
Asplin, R.G., et al.; "A new Generation Side Scan Sonar"; OCEANS '88 Proceedings. 'A Partnership of Marine Interests'; vol. 2; Oct.-Nov. 1988; pp. 329-334.
Baker, N., et al, "Rifting History of the Northern Mariana Trough: SeaMARCH II and Seismic Reflection Surveys," Journals of Geophysical Research vol. 101, No. B5, May 10, 1996.
Ballantyne, J.; "Find and Catch More Fish, Quickly and Easily, with the FISHIN' BUDDY 2255"; [Online]; [Retrieved on Dec. 7, 2011]; Retrieved from the Internet <URL:http://www.articleslash.net/Recreation-and-Sports/Fishing/67018_Find-and-Catch-More-Fish-Quickly-and-Easily-with-the-FISHIN-BUDDY-2255.html>; 4 pages.
Carey, W.M.,"Sonar Array Characterization, Experimental Results"; IEEE Journal of Oceanic Engineering ; vol. 23; Issue 3, Jul. 1998, pp. 297-306.
Cowie, P.A., et al., "Quantitative Fault Studies on the East Pacific Rise: A Comparison of Sonar Imaging Techniques," Journal of Geophysical Research, vol. 99, B8, Aug. 10, 1994.
Curcio, J., et al.; "SCOUT—A Low Cost Autonomous Surface Platform for Research in Cooperative Autonomy"; Department of Mechanical Engineering; Massachusetts Institute of Technology; Aug. 2005.
Farrell, E.J.; , "Color Display and Interactive Interpretation of Three-Dimensional Data"; IBM Journal of Research and Development; vol. 27, No. 4; Jul. 1983; pp. 356-366.
Glynn, Jr., J.M., et al.; "Survey Operations and Results Using a Klein 5410 Bathymetric Sidescan Sonar"; Retrieved from the Internet <URL: http://www.thsoa.org/hy07/03_04.pdf; Mar. 2007.
Hansen, H.H.; "Circular vs. rectangular transducers"; Department of Electronics and Telecommunications; Norwegian University of Science and Technolgy; Mar. 2010; 28 pages.
Hughes Clarke, J. E., et al.; Knudsen 320 200 kHz keel-mounted sidescan trials; Results from 2000/2001/2002 field operations; [online]; Retrieved on Jun. 23, 2010 from the Internet <URL: http://www.omg.unb.ca/Ksidescan/K320_SStrials.html; 11 pages.

Hughes Clarke, J.E.; "Seafloor characterization using keel-mounted sidescan: proper compensation for radiometric and geometric distortion"; Canadian Hydrographic Conference; May 2004; 18 pages.
Hussong, D.M., et al., "High-Resolution Acoustic Seafloor Mapping," $20^{th}$ Annual OTC, Houston, TX, May 2-5, 1988.
Jonsson, J., et al. "Simulation and Evaluation of Small High-Frequency Side-Scan Sonars using COMSOL"; Excerpt from the Proceedings of the COMSOL Conference; 2009; Milan, Italy.
Key, W.H.; "Side Scan Sonar Technology"; Oceans 2000 MTS/IEEE Conference and Exhibition; vol. 2; Sep. 2000, pp. 1029-1033.
Kielczynski, P., et al.; "Finite Element Method (FEM) and Impulse Response Method (IRM) analysis of circular and rectangular transducers"; 1995 IEEE Ultrasonics Symposium; 1995; pp. 693-696.
Kozak, G.; "Side Scan Sonar Target Comparative Techniques for Port Security and MCM Q-Route Requirements"; L-3 Communications; Klein Associates, Inc.; [Online]; Retrieved from the Internet <URL: http://www.chesapeaketech.com/techniques-port-security.pdf; 11 pages.
Krotser, D.J., et al.; "Side-Scan Sonar: Selective Textural Enhancement"; Oceans'76; Washington, DC; Sep. 1976.
Kvitek, R.G., et al.; "Victoria Land Latitudinal Gradient Project: Benthic Marine Habitat Characterization"; California State University; Monterey Bay; Field Report; Feb. 25, 2004.
Langeraar, W.; "Surveying and Charting of the Seas"; Elsevier Oceanography Series; vol. 37; Sep. 1983; p. 321.
Manley, J.E.; "Development of the Autonomous Surface Craft 'Aces'"; Oceans '97 MTS/IEEE Conference Proceedings; Oct. 1997; pp. 827-832.
Manley, J.E., et al.; "Evolution of the Autonomous Surface Craft 'AutoCat'"; Oceans 2000 MTS/IEEE Conference and Exhibition; vol. 1; Sep. 2000; pp. 403-408.
Melvin, G., et al.; Commercial fishing vessels, automatic acoustic logging systems and 3D data visualization; ICES; Journal of Marine Science; vol. 59; Issue 1; 2002; pp. 179-189.
Newman, P.M.; "MOOS—Mission Orientated Operating Suite"; Department of Ocean Engineering; Massachusetts Institute of Technology; 2002.
Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.
Prickett, T.; "Underwater Inspection of Coastal Structures"; The REMR Bulletin; vol. 14; No. 2; Aug. 1997.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
Shono, K., et al.; "Integrated Hydro-Acoustic Survey Scheme for Mapping of Sea Bottom Ecology"; Ocean Research Institute; Tokyo, Japan; Nov. 2004.
Trevorrow, M.V., et al.; "Description and Evaluation of a Four-Channel, Coherent 100-kHz Sidescan Sonar"; Defence R&D Canada-Atlantic; Dec. 2004.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; pp. 329-334.
Waite, A.D.; "Sonar for practising Engineers"; Third Edition; John Wiley & Sons, Ltd.; West Sussex, England; © 2002; 323 pages.
Alpine Geophysical Data Programmer Model 485C Brochure and letter dated Feb. 17, 1976; 2 pages.
Benthos C3D Sonal Imaging System; "High Resolution Side Scan Imagery with Bathymetry"; Benthos, Inc.; © May 2002.
Coastal Engineering Technical Note; "Side-Scan Sonar for Inspecting Coastal Structures"; U.S. Army Engineer Waterways Experiment Station; Revised Nov. 1983.

(56) References Cited

OTHER PUBLICATIONS

ConCAT Containerised Catamaran; Inshore hydrographic survey vessel that fits in a container; In Cooperation with Uniteam International; Kongsberg Simrad AS; Apr. 2004.
Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.
Deep Vision Side Scan Sonar Systems; [Online]; [Retrieved on Dec. 2, 2011]; Retrieved from the Internet <URL:http://www.deepvision.se/products.htm>, 5 pages.
Detailed Sonar Transducer Product Information; Transducer Products; Side Scans; Models T36, T63, T62, and T403; Dec. 30, 2003; Retrieved from internet: URL:http://www.neptune-sonar.com/products.as_btype=Side-Scan+Transducers&category=, 4 pages.
EDO Corporation Global Technology Reach, Model 6400 Fan Beam Transducer; http:/web/archive/org/web/20040608054923/www.edoceramic.con/NavDucers.htm; Jun. 3, 2004.
EM1110-2-1003; Department of the Army; U.S. Army Corps of Engineers; Engineering and Design; Hydrographic Surveying; Apr. 1, 2004.
U.S. Appl. No. 60/552,769, filed Mar. 12, 2004; Applicant: Terrence Schoreder.
Final Report; Early Implementation of Nearshore Ecosystem Database Project Tasks 2 and 3; [online]; Retrieved on Feb. 26, 2010 from the Internet <URL: http://seafloor.csumb.edu/taskforce/html%202%20web/finalreport.htm; 90 pages.
Fishin' Buddy 4200™ Operations Manual; Dated Dec. 21, 2005; 16 pages.
FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.
Fishing Tool Reviews—Bottom Line Fishin Buddy 1200 Fishfinder; [Online]; [Retrieved on Dec. 7, 2011]; Retrieved from the Internet <URL:http://www.tackletour.com/reviewbottomline1200.html>; 4 pages.
GeoAcoustics; A Kongsberg Company; GeoSwath Plus Brochure; "Wide swath bathymetry and georeferenced side scan"; [Online]; Retrieved from the internet < URL: http://www.km.kongsberg.com/ks/web/nokbg0397.nsf/AllWeb/F4B7FD3461368388C1257599002D34BC/$file/GeoSwath-Plus-brochure.pdf?OpenElement.
GeoPulse; GeoAcoustics Pinger Sub-Bottom Profiler; Retrieved from the Internet <URL:http://www.km.kongsberg.com/ks/web/nokbg0397.nsf/AllWeb/D1084BB7DD0FD21DC12574C0003E01EA/$file/GeoPulse_Profiler.pdf?OpenElement; GeoAcoustics Limited, UK; A Kongsberg Company.
GlobalMap Sport; Installation and Operation Instructions; Lowrance Electronics, Inc.; © 1996; 61 pages.
GPS Speed Correction; Sidescan Sonar; [online]; Retrieved from the Internet URL: <www.hydrakula.uni-kiel.de/downloads/Sidescan%20Sonar.doc; 10 pages.
Humminbird 100 Series™ Fishin' Buddy® ; 110, 120, 130 and 140c Product Manual; © 2007; 2 pages.
Humminbird 1197c Operations manual; Nov. 6, 2007; 196 pages.
Humminbird 200DX Dual Beam Operations Manual; 43 pages.
Humminbird 500 Series; 550, 560, 570 and 570 DI Operations Manual; © 2010; 84 pages.
Humminbird: America's favorite Fishfinder—The leading innovator of Side Imaging technology; [Online]; [Retrieved on Mar. 16, 2011]; Retrieved from the Internet <URL: http://www.humminbird.com/support/ProductManuals.aspx>; 20 pages.
Humminbird Dimension 3 Sonar 600 Operations Manual; 24 pages.
The Humminbird GPS Navigational System. Nothing Else Even Close.; Humminbird Marine Information Systems ®; 1992; 10 pages.
Humminbird GPS NS 10 Operations Manual; 75 pages.
Humminbird High Speed Transducer; 4 pages.
Humminbird LCR 400 ID Operations Manual; 28 pages.
Humminbird Marine Information Systems; Dimension 3 Sonar™; 1992; 16 pages.
Humminbird "Matrix 35 Fishing System," Prior to Aug. 2, 2003.
Humminbird Matrix 35 Fishing System; 2 pages.
Humminbird Matrix 55 and 65 Operations Manual; © 2003; 40 pages.
Humminbird Matrix 67 GPS Trackplotter Operations Manual; © 2003; 88 pages.
Humminbird "Matrix 97 GPS Trackplotter Operations Manual" 2003.
Humminbird Matrix 97 Operations Manual; © 2003; 87 pages.
Humminbird Matrix™ 87c Operations Manual; © 2004; 45 pages.
Humminbird The New Wave of Wide; 1997; Humminbird Wide®; fish wide open!®; 24 pages.
Humminbird NS25 Operations Manual; 71 pages.
Humminbird Piranha 1 & 2 Operation Guide; 5 pages.
Humminbird Platinum ID 120 Operations Manual; 36 pages.
Humminbird Platinum ID 600 Operations Manual; 18 pages.
Humminbird "The Product Line>Matrix Products>Matrix 35" http://web.archive.org/web/20030404000447/www.humminbird.com/hb_Products.asp?ID, Apr. 4, 2003.
Humminbird® Trolling Motor Mounted Transducer with Mount Assembly Brochure; © 2008 Humminbird®, Eufaula, AL; 2 pages.
Humminbird Wide 3D Paramount Operations Manual; 44 pages.
Humminbird Wide 3D View Operations Manual; 38 pages.
Humminbird Wide 3D Vision Operations Manual; 38 pages.
Humminbird Wide 3D Vista Operations Manual; 38 pages.
Humminbird Wide Eye Operations Manual; 32 pages.
Humminbird Wide Paramount Operations Manual; fish wide open!; 32 pages.
Humminbird "Wideside"; Schematic; Dec. 15, 1994; 5 pages.
Hydro Products; A Tetra Tech Company; 4000 Series Gifft Precision Depth Recorder Product Brochure; date stamped 1977.
The Hydrographic Society—Corporate Member News—Kongsberg Simrad; Jul. 3, 2008; 7 pages.
Imagenex Model 855 Brochure: Online; Documents retrieved from internet web archives as follows: URL:http://web.archive.org/web/20021023212210/http:/www.imagenex.com/Products/855_858/855_858.html; 1 page; Archived on Oct. 23, 2002. URL:http://web.archive.org/web/20021024124035/http:/www.imagenex.com/Products 855_858/855/855.html; 1 page; Archived on Oct. 24, 2002. URL:http://web.archive.org/web/20021024125254/http:/www.imagenex.com/Products/855_858/858/858.html; 1 page; Archived on Oct. 24, 2002. URL:http://web.archive.org/web/20030424071306/http:/www.imagenex.com//855_Page_1.jpg; 1 page; Archived on Apr. 24, 2003. URL:http://web.archive.org/web/20030424091547/http:/www.imagenex.com/855_Page_2.jpg; 1 page; Archived on Apr. 24, 2003.URL:http://web.archive.org/web/20030424094158/http:/www.imagenex.com/855_Page_3.jpg; 1 page; Archived on Apr. 24, 2003. URL:http://web.archive.org/web/20030424101301/http:/www.imagenex.com/855_Page_4.jpg; 1 page; Archived on Apr. 24, 2003.URL:http://web.archive.org/web/20030424101939/http:/www.imagenex.com/855_Page_5.jpg; 1 page; Archived on Apr. 24, 2003. URL:http://web.archive.org/web/20030424135458/http:/www.imagenex.com/855_Page_6.jpg; 1 page; Archived on Apr. 24, 2003. URL:http://web.archive.org/web/20030424141232/http:/www.imagenex.com/855_Page_7.jpg; 1 page; Archived on Apr. 24, 2003. URL:http://web.archive.org/web/20030424143158/http:/www.imagenex.com/855_Page_8.jpg; 1 page; Archived on Apr. 24, 2003.
Imagenex Model 872 "Yellowfin" Sidescan Sonar; Imagenex Technology Corp.; © 2004-2009.
The Imagenex SportScan; Digital Sidescan Sonar; "Redefining Image Clarity"; Imagenex Technology Corp.; © 2002.

(56) References Cited

OTHER PUBLICATIONS

Imagenex SportScan Digital SideScan Sonar Brochure: Online; Documents retrieved from internet web archives as follows: URL:http://web.archive.org/web/20030212030409/http://www.imagenex.com/Products/products.html; 1 page; Archived on Feb. 12, 2003. URL:http://web.archive.org/web/20030214044915/http://www.imagenex.com/Products/SportScan/sportscan.html;1 page; Archived on Feb. 14, 2003. URL:http://web.archive.org/web/20030222152337/http://www.imagenex.com/Products/SportScan/SportScan_Specs/sportscan_specs.html; 3 pages; Archived on Feb. 22, 2003. URL:http://web.archive.org/web/20030222161450/http://www.imagenex.com/Products/SportScan/FAQ_s/faq_s.html; 4 pages; Archived on Feb. 22, 2003. URL:http://web.archive.org/web/20030419024526/http://www.imagenex.com/Products/SportScan/distributors.html; 2 page; Archived on Apr. 19, 2003.

Imagenex (Various) Technical Specifications and User's Manual; Prior to Aug. 2003.

Innomar—Products; "System Variants: SES Side Scan Option"; Retrieved from internet URL:http://www.innomar.com/produ_2000sidescan.htm; Dec. 30, 2003; 2 pages.

International Search Report and Written Opinion for Application No. PCT/US2010/039441 dated Oct. 11, 2010.

International Search Report and Written Opinion for Application No. PCT/US2010/039443 dated Oct. 6, 2010.

"ITC Application Equations for Underwater Sound Transducers"; Published by International Transducer Corporation, 1995, Rev. Aug. 2000; 3 pages.

Kelvin Hughes Transit Sonar; ". . . a new dimension in shallow water survey to assist in . . . "; Hydrography; Dredging; Salvage; Underwater Construction and Similar Works; Mar. 1966; 8 pages.

Klein Digital Sonar Systems, ". . . The Next Generation From the World Leader in Side Scan Sonar and Sub-bottom Profiling Systems," 1988.

Kongsberg Brochure EA 400 Survey; "A complete, integrated survey system"; Kongsberg Maritime AS; Oct. 2003.

Kongsberg Brochure EA 400/600 "Sidescan Echo sounder with combined sidescan and depth soundings"; Kongsberg Maritime AS; May 2004.

Lowrance HS-3DWN Transducer Assembly and Housing (Eagle IIID); Aug. 1994.

Lowrance LCX-18C & LCX-19C Fish-finding Sonar & Mapping GPS; Operation Instructions; © 2002; 200 pages.

Lowrance Transducers Product Information; 1 page.

Navico Design Report of Raytheon Electronics Side Looker Transducer; Mar. 12, 2010; 18 pages.

NOAA: Nautical Charting general information from public records; [Online]; Retrieved on Sep. 10, 2010 from the Internet <URL: http://www.nauticalcharts.noaa.gov/csdl/learn_hydroequip.html; 2 pages; http://www.nauticalcharts.noaa.gov/csdl/learn_hydroequip.html; 1 page; http://www.nauticalcharts.noaa.gov/csdl/PDBS.html; 2 pages; http://www.nauticalcharts.noaa.gov/hsd/pub.html; 1 page; http://www.nauticalcharts.noaa.gov/hsd/fpm/fpm.htm; 1 page; http://www.ozcoasts.gov.au/geom_geol/toolkit/Tech_CA_sss.jsp; 12 pages.

ONR Grant N66604-05-1-2983; Final Report; "Cooperative Autonomous Mobile Robots"; Retrieved from the Internet <URL: http://dodreports.com/pdf/ada463215.pdf; Post 2006.

Odom Echoscan™ : For Sea Floor or Riverbed Surveys; Odom Hydrographic Systems; Apr. 26, 2002.

Odom Hydrographic Systems Echoscan Manual; Revision 1.11; Apr. 26, 2002.

"Product Survey Side-Scan Sonar"; Hydro International Magazine; vol. 36; Apr. 2004; pp. 36-39.

R/V Quicksilver; Hydrographic Survey Launch Bareboat or Drewed; F/V Norwind, Inc.

R/V Tangaroa; Fact Sheet; Explore lost worlds of the deep; Norfanz Voyage; May 10 to Jun. 8, 2003.

SeaBat 8101 Product Specification; 240kHz Multibeam Echo Sounder; © 1999 RESON Inc.; Version 4.0.

Sidefinder—Reviews & Brand Information—Techsonic Industries, Inc.; [Online]; [Retrieved on Dec. 7, 2011]; Retrieved from the Internet <URL: http://www.trademarkia.com/sidefinder-74113182.html>; 3 pages.

Simrad EA 500; Hydrographic Echo Sounder; Product Specifications; Revision: Sep. 1993.

SonarBeam Underwater Surveying System Using T-150P tow-fish hull mounted; [Online]; [Retrieved on Feb. 12, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902034.html; 4 pages; [Retrieved on Feb. 16, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902230.html; 7 pages.

Starfish 450H; Sidescan System; Tritech Inernational Limited; UK. T297-00-01-01 Transducer housing outline drawing; Neptune Sonar Ltd.; © 2002.

Techsonic Industries, Inc.; "Mask, Acoustic"; Schematic, May 24, 1996.

Techsonic Industries, Inc.; "Element, 455 kHz"; Schematic, Jun. 13, 1996.

Trademark Electronic Search System (TESS); Word Mark: Sidefinder; [Online]; [Retrieved on Dec. 7, 2011]; Retrieved from the Internet <URL:http://tess2.uspto.gov/bin/showfield?f=doc&state=4009:qi4jkj.2.1>; 2 pages.

"Transducers Quad Beam," Prior to Aug. 2, 2003.

U-Tech Company Newsletter.

USACE, "Chapter 11, Acoustic Multibeam Survey Systems for Deep-Draft Navigation Projects," Apr. 1, 2004.

Ultra III 3D Installation and Operation Instructions; EAGLE™; © 1994.

Westinghouse Publication; "Side-Scan Sonar Swifly Surveys Subsurface Shellfish"; May 1970; 4 pages.

Sonar Theory and Applications; Excerpt from Imagenex Model 855 Color Imaging Sonar User's Manual; Imagenex Technology Corp.; Canada; 8 pages.

De Jong, C. D., et al.; "*Hydrography: Series on Mathematical Geodesy and Positioning*;" VSSD; ISBN 90-407-2359-1; dated 2002.

Berktay, H. O., et al.; "*Farfield performance of parametric transmitters*;" Journal of Acoustical Society of America, vol. 55, No. 3; dated Mar. 1974.

Fried, N. W.; "*An Investigation of a Large Step-Down Ratio Parametric Sonar and Its Use in Sub-Bottom Profiling*;" Thesis: Simon Fraser University; dated Aug. 1992.

Hardiman, J. E., et al.; "*High Repetition Rate Side Looking Sonar*;" Oceans 2002 MTSIEEE, vol. 4; dated Oct. 2002.

Naoi, J., et al.; "*Sea Trial Results of a Cross Fan Beam Type Sub-Bottom Profiler*;" Japanese Journal of Applied Physics, vol. 39, No. 5; dated May 2000.

Plueddemann, A. J., et al.; "*Design and Performance of a Self-Contained Fan-Beam. ADCP*;" IEEE Journal of Oceanic Engineering, vol. 26, No. 2; dated Apr. 2001.

Riordan, J., et al.; "*Implementation and Application of a Real-time Sidescan Sonar Simulator*;" Oceans 2005—Europe, vol. 2; dated Jun. 2005.

Yang, L., et al.; "*Bottom Detection for Multibeam Sonars with Active Contours*;" MTSIEEE Conference Proceedings, vol. 2; dated Oct. 1997.

"*100 W adjustable Wide-Beam: Transom-Mount Transducer—P48W*;" Airmar Technology Corporation; <www.airmar.com>.

Extended European Search Report for Application No. 13153403.4; dated May 7, 2013.

Office Action for Japanese Application No. 2012-267270 dated Dec. 2, 2013.

Tokuyama, H. et al., *Principles and Applications of Izanagi Oceanfloor Imaging Sonar System*, Journal of the Japan Society of Photogrammetry and Remote Sensing, vol. 29, No. 2, 1990, pp. 76-83.

Yamamoto, F. et al., *Oceanfloor Imaging System—Izanagi*, Journal of the Japan Society for Marine Surveys and Technology 1 (2), Sep. 1989, pp. 45-51, 53 and 54.

(56) References Cited

OTHER PUBLICATIONS

Clausner, J.E. and Pope, J., 1988. "Side-scan sonar applications for evaluating coastal structures"; U.S. Army Corps of Engineers, Technical Report CERC-88-16; 80 pages.
Garmin; GPSMAP® 4000/5000 Series, Owner's Manual; 2007; 54 pages.
Hare, M.R., "Small-Boat Surveys in Shallow Water", 2008 Institute of Ocean Sciences, Marine habitat mapping Technology for Alaska; 19 pages.
Hayes, M.P. and Ho, T.Y., 2000. "Height estimation of a sonar towfish from sidescan imagery", Hamilton: Proc. Image Vision Computing New Zealand; 6 pages.
Humminbird 1100 Series Operations Manual; © 2007; 196 pages.
Imagenex Technology Corp., Model 881 Digital Tilt Adjust Imaging Sonar; Hardware Specifications; Aug. 12, 2002; 3 pages.
Klein Associates, Inc.; 1985, "Side Scan Sonar Training Manual", Side Scan Sonar Record Interpretation; 151 pages.
Mazel, C. H., 1984 "Inspection of Surfaces by Side-Scan Sonar," ROV '84 Remotely Operated Vehicle Conference of the Marine Technology Society, 7 pages.
SOLAS Chapter V; Safety of Navigation, Jul. 1, 2001; [Online]; Retrieved from the Internet URL:https://www.gov.uk/government/uploads/system/uploads/attachment_data/file/343175/solas_v_on_safety_of_navigation.pdf.
Tucker, M. J., and Stubbs, A. R., "Narrow-beam echo-ranger for fishery and geological investigations", British Journal of Applied Physics vol. 12:3 pp. 103-110 (1961).
Montgomery, E.T., et al., "Documentation of the U.S. Geological Survey Oceanographic Time-Series Measurement Database", USGS Open-File Report 2007-1194; 2 pages.
WESMAR; 500SS Sidescan Brochure; Feb. 1985; 2 pages.
WESMAR; 500SS Side Scan Brochure; May 1998; 2 pages.
WESMAR; 500SS Side Scan Owner's Manual; 82 pages.
WESMAR; SHD 700SS; "Super High Definition Side Scan Sonar with Color Video Display Capability", Operations Manual, May 1998, 45 pages.
WESMAR; SHD 700SS Super High Definition Side Scan Sonar; date unknown; 4 pages.
Wilson, D., "Side Scan Sonar: The Key to Underwater Survey", Flinders Archaeology Blog, Oct. 25, 2011, 4 pages.
Layton, J., Strickland, J., Bryant, C.W., How Google Earth Works, HowStuffWorks, Mar. 25, 2010, 2 pages; [Online]; Retrieved from Internet URL: http ://wayback.archive.org/web/20100425042606/ http://computer.howstuffworks.com/internet/basics/google-earth7.htm.
"*Improved sidescan performance on Lowarance LSSI*;" Dr.Depth: Sea bottom mapping software; retrieved on Oct. 5, 2011 from <http:www.dr.depth.se/rdfour.php?1=gb>.
Search Report for European Application No. 12195752.6; dated Mar. 7, 2013.
Humminbird Wide Optic Operations Manual 1997; fish wide open!: 32 pages.
Humminbird Wide Brochure 1997; fish wide open!; 4 pages.
Humminbird 997c SI Combo Installation and Operations Manual 2008; 151 pages.
Humminbird 757c, 787c2 and 757c2i GPS Chartplotter Operations Manual 2006; 161 pages.
Lowrance Electronics, Inc.; X-70A 3D Installation and Operation Instructions; 44 pages.
Raymarine: DSM25 Digital Sounder Module Owner's Handbook; 62 pages.
Raymarine: A65 GPS Chartplotter Owners Handbook; © Raymarine 2006; 100 pages.
Raymarine: E-series Networked Display: Reference Manual; Mar. 2006; 51 pages.
Kongsberg Publication; Pohner, Freddy et al.; Integrating imagery from hull mounted sidescan sonars with multibeam bathymetry: 16 pages.
Airmar Technology Corporation, R209 Dual Frequency 2 to 3W Transducer; Oct. 10, 2007; 2 pages.
Airmar Technology Corporation, R99 Dual Frequency 2kW Transducer; May 2, 2006; 2 pages.
DeRoos, Bradley G. et al., Technical Survey and Evaluation of Underwater Sensors and Remotely Operated Vehicles; May 1993; 324 pages.
Klein Associates, Inc., Klein Hydroscan System, 1983; 52 pages.
Office Action for Japanese Application No. 2013-037874 dated Mar. 26, 2014.
Petition for Inter Partes Review of U.S. Pat. No. 8,305,840; IPR2013-00355; dated Jun. 13, 2013; Raymarine, Inc.; 63 pages.
Declaration of Paul Stokes for Inter Partes Review of U.S. Pat. No. 8,305,840; IPR2013-00355; dated Jun. 12, 2013; Raymarine, Inc.; 118 pages.
Patent Owner's Preliminary Response; Inter Partes Review of U.S. Pat. No. 8,305,840; IPR2013-00355; dated Sep. 17, 2014; Navico Holding AS; 110 pages.
Decision for Inter Partes Review of U.S. Pat. No. 8,305,840; IPR2013-00355; dated Dec. 12, 2013; United States Patent and Trademark Office; 36 pages.
Judgment of Inter Partes Review of U.S. Pat. No. 8,305,840; IPR2013-00355; dated Mar. 25, 2014; United States Patent and Trademark Office; 3 pages.
Petition for Inter Partes Review of U.S. Pat. No. 8,305,840; IRP2013-00496; dated Aug. 6, 2013; Raymarine, Inc.; 63 pages.
Declaration of Paul Stokes for Inter Partes Review of U.S. Pat. No. 8,305,840; IRP2013-00496; dated Aug. 2, 2013; Raymarine, Inc.; 124 pages.
Patent Owner's Preliminary Response; Inter Partes Review of U.S. Pat. No. 8,305,840; IPR2013-00496 ; dated Sep. 17, 2014; Navico Holding AS; 114 pages.
Decision for Inter Partes Review of U.S. Pat. No. 8,305,840; IPR2013-00496; dated Feb. 11, 2014; United States Patent and Trademark Office; 14 pages.
Judgment of Inter Partes Review of U.S. Pat. No. 8,305,840; IPR2013-00496; dated Mar. 25, 2014; United States Patent and Trademark Office; 3 pages.
Petition for Inter Partes Review of U.S. Pat. No. IPR-2013-00497; dated Aug. 6, 2013; Raymarine, Inc.; 64 pages.
Declaration of Paul Stokes for Inter Partes Review of U.S. Pat. No. 8,305,840; IPR2013-00497; dated Aug. 2, 2013; Raymarine, Inc.; 166 pages.
Patent Owner's Preliminary Response; Inter Partes Review of U.S. Pat. No. 8,305,840; dated Sep. 17, 2014; Navico Holding AS; 102 pages.
Decision for Inter Partes Review of U.S. Pat. No. 8,305,840; IPR2013-00497; dated Feb. 11, 2014; United States Patent and Trademark Office; 17 pages.
Judgment of Inter Partes Review of U.S. Pat. No. 8,305,840; IPR2013-00497;Mar. 25, 2014; United States Patent and Trademark Office; 3 pages.
Supplemental Response to second set of Interrogatories; International Trade Commission; Investigation No. 337-TA-898; dated Jan. 6, 2014; Raymarine, Inc.; 12 pages.
Invalidity Contention; U.S. Pat. No. 8,305,840 Invalidity Claim Chart; Exhibit A01—Hydrography; Feb. 12, 2014; 30 pages.
Invalidity Contention; U.S. Pat. No. 8,305,840 Invalidity Claim Chart; Exhibit A02—Hydrography, Lustig; Feb. 12, 2014; 42 pages.
Invalidity Contention; U.S. Pat. No. 8,305,840 Invalidity Claim Chart; Exhibit A03—Hydrography, Adams; Feb. 12, 2014; 49 pages.
Invalidity Contention; U.S. Pat. No. 8,305,840 Invalidity Claim Chart; Exhibit A04—Hydrography, Boucher '522; Feb. 12, 2014; 39 pages.
Invalidity Contention; U.S. Pat. No. 8,305,840 Invalidity Claim Chart; Exhibit A05—Hydrography, Boucher '522, Adams; Feb. 12, 2014; 54 pages.
Invalidity Contention; U.S. Pat. No. 8,305,840 Invalidity Claim Chart; Exhibit A06—Hydrography, Adams, Betts; Feb. 12, 2014; 29 pages.
Invalidity Contention; U.S. Pat. No. 8,305,840 Invalidity Claim Chart; Exhibit A07—Hydrography, Boucher '522, Adam, Betts; Feb. 12, 2014; 33 pages.

(56) References Cited

OTHER PUBLICATIONS

Invalidity Contention; U.S. Pat. No. 8,305,840 Invalidity Claim Chart; Exhibit A08—Hydrography, Boucher '798, DeRoos, Adams; Feb. 12, 2014; 46 pages.
Invalidity Contention; U.S. Pat. No. 8,305,840 Invalidity Claim Chart; Exhibit A09—Hydrography, Boucher '798, DeRoos, Adams, Betters; Feb. 12, 2014; 33 pages.
Invalidity Contention; U.S. Pat. No. 8,305,840 Invalidity Claim Chart; Exhibit A10—Furuno; Feb. 12, 2014; 58 pages.
Invalidity Contention; U.S. Pat. No. 8,305,840 Invalidity Claim Chart; Exhibit A11—Airmar P48; Feb. 12, 2014; 70 pages.
Invalidity Contention; U.S. Pat. No. 8,305,840 Invalidity Claim Chart; Exhibit A12—Russell-Cargill et al; Feb. 12, 2014; 89 pages.
Invalidity Contention; U.S. Pat. No. 8,305,840 Invalidity Claim Chart; Exhibit A13—Kongsberg EA 400/600; Feb. 12, 2014; 57 pages.
Invalidity Contention; U.S. Pat. No. 8,305,840 Invalidity Claim Chart; Exhibit A14—Sato; Feb. 12, 2014; 6 pages.
Invalidity Contention; U.S. Pat. No. 8,305,840 Invalidity Claim Chart; Exhibit A15—Chiang, E-Series; Feb. 12, 2014; 5 pages.
Invalidity Contention; U.S. Pat. No. 8,305,840 Invalidity Claim Chart; Exhibit A16—Bird, Wilcox, Nishimori, Hamada, Blue, Fatemi-Boosheri, Boucher '798, Thompson, Betts, Zimmerman, P48, Tri-Beam, Imagenex, Odom Echoscan; Feb. 12, 2014; 40 pages.
Invalidity Contention; U.S. Pat. No. 8,305,840 Invalidity Claim Chart; Exhibit A17—Hydrography, Humminbird 997c, Betts; Feb. 12, 2014; 69 pages.
Invalidity Contention; U.S. Pat. No. 8,305,840 Invalidity Claim Chart; Exhibit A18—Humminbird 997c; Feb. 12, 2014; 83 pages.
Invalidity Contention; U.S. Pat. No. 8,305,840 Invalidity Claim Chart; Exhibit A19—Betts; Feb. 12, 2014; 49 pages.
Invalidity Contention; U.S. Pat. No. 8,300,499 Invalidity Claim Chart; Exhibit B01—Tri-Beam; Feb. 12, 2014; 31 pages.
Invalidity Contention; U.S. Pat. No. 8,300,499 Invalidity Claim Chart; Exhibit B02—Hydrography, Humminbird 757 c; Feb. 12, 2014; 38 pages.
Invalidity Contention; U.S. Pat. No. 8,300,499 Invalidity Claim Chart; Exhibit B03—Airmar-R209, Humminbird 757 c; Feb. 12, 2014; 43 pages.
Invalidity Contention; U.S. Pat. No. 8,300,499 Invalidity Claim Chart; Exhibit B04—Airmar-R209, Hydrography, Humminbird 757c, Sato, Aimar-R99, Zimmerman; Feb. 12, 2014; 59 pages.
Invalidity Contention; U.S. Pat. No. 8,300,499 Invalidity Claim Chart; Exhibit B05—Odom Echoscan; Feb. 12, 2014; 45 pages.
Invalidity Contention; U.S. Pat. No. 8,300,499 Invalidity Claim Chart; Exhibit B06—Kongsberg EA 400/600; Feb. 12, 2014; 37 pages.
Invalidity Contention; U.S. Pat. No. 8,300,499 Invalidity Claim Chart; Exhibit B07—Nishimori, Thompson, Betts, Zimmerman, Melvin, Tri-Beam, Odom Echoscan; Feb. 12, 2014; 22 pages.
Invalidity Contention; U.S. Pat. No. 8,300,499 Invalidity Claim Chart; Exhibit B08—Hydrography, Betts et al, Humminbird 997c and 757c; Feb. 12, 2014; 61 pages.
Invalidity Contention; U.S. Pat. No. 8,300,499 Invalidity Claim Chart; Exhibit B09—Humminbird 997c; Feb. 12, 2014; 40 pages.
Invalidity Contention; U.S. Pat. No. 8,300,499 Invalidity Claim Chart; Exhibit B10—Betts; Feb. 12, 2014; 29 pages.
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67pages.
Office Action for European Application No. 10728530.6, dated Apr. 2, 2013.
Office Action for European Application No. 10729001.7, dated Apr. 5, 2013.
Marine Acoustics Society of Japan (Editor); "Basics and Application of Marine Acoustics"; Apr. 28, 2004; pp. 152-172.
PCT International Search Report and Written Opinion; PCT/IB2013/060285; Feb. 18, 2014.
PCT International Search Report and Written Opinion; PCT/us2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
Airmar Press Release: *Airmar Introduces P48W 200kHz Adjustable, Wide-Beam, Transom-Mount: Industry's widest 200 kHz transducer can help win fishing tournaments* (Apr. 23, 2009).
Airmar Technology Corporation Brochure/Presentation: Guide to Transducer Technology (Aug. 18, 2010).
Airmar Technology Corporation Datasheet: P48W Transom-Mount Adjustable Wide-Beam, (Dec. 2010).
Owner's Guide & Installation Instructions, Transam or Tolling Motor Mount, Chirp or Adjustable Wide-beam Transducer, Models: P48W, TM130M, TM150M, TM210H (2013).
Airmar Technology Corporation Brochure DST800 Retractable Transducer System Sep. 2005.
Garmin GPSMAP 3206/3210 Color Chartplotter Owner's Manual (Jun. 2006).
GeoAcoustics, GeoSwath Operation Manual Swath 6100/B (Sep. 1998).
GeoAcoustics, GeoSwath Product Bulletin (2000).
Hogarth, P., Low Cost Swath Bathymetry: Widening the swath bathymetry market, Hydro International (Jul. 2000).
Datasheet / Specification for Imagenex Sportscan, (Aug. 2005).
Imagenex Model 858 User's Manual (May 1999).
Imagenex Model 855 User's Manual (Nov. 1991).
Imagenex Sportscan Installation / Setup Manual (date unknown).
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html
Side Scan PC Operation Manual: SSS-100k PC, SSS-600K PC, SSS-100k/600K PC Side Scan Sonar Operation and Maintenance Manual, JW Fishers MFG Inc (date unknown).
Klein Associates Brochure: Hydroscan for Pipeline Survey (date unknown).
Klein Associates Brochure: Klein Smartfish, A Proven Platform for Deep Tow Applications (date unknown).
Klein Associates Brochure: System 3900—Dual-Frequency Side Scan Sonar for Search and Recovery (Nov. 2008).
Klein Associates Product Catalog Supplement: Sub-Bottom Profiler & Microprofiler (Supplement to Hydroscan catalog) (Nov. 1983).
Klein Hydroscan Applications Bulletin: Oil and Gas Pipeline Routing, Laying and Inspection, (Jan. 1983).
Kucharski, William M., and Clausner, James E., Underwater Inspection of Coastal Structures Using Commercially Available Sonars, Technical Report REMR-CO-11, US Army Corps of Engineers, Department of the Army (Feb. 1990).
Mazel, Charles H., Inspection of Surfaces by Side Scan Sonar, Proceedings of the Remotely Operated Vehicles Conference and Exposition, (1984).
EA 400/600 Sidescan: Echo Sounder with Combined Sidescan and Depth Soundings, Konigsberg Maritime AS, (Nov. 2005).
SIMRAD EK 500 Fishery Research Echo Sounder Installation Manual (Jun. 2006).
SIMRAD EK 500 Fishery Research Echo Sounder Operator Manual (May 1996).
Avera W., et al., Multibeam Bathymetry from a Mine-Hunting Military Sonar, Report No. NRL/JA/7440-02-1010, Naval Research Laboratory and Naval Oceanographic Office, (Nov. 2002).
Barbu, Madalina, "Acoustic Seabed and Target Classification using Fractional Fourier Transform and Time-Frequency Transform Techniques" Dissertation Paper 480, University of New Orleans (2006).

(56) References Cited

OTHER PUBLICATIONS

Barbu, C., et al., AQS-20 Sonar Processing Enhancement for Bathymetry Estimation, pp. 1-5, Presented at OCEANS Conference (2005).
Buchanan, H.L. and Lt. Cmdr. John M. Cottinham, Countering Mines in 2005, Sea Technology, vol. 41, No. 1, pp. 24-29, (Jan. 2000).
Elmore, P.A., et al., Environmental Measurement Derived from Tactical Mine Hunting Sonar Data, pp. 1-5, Presented at OCEANS Conference (2007).
Elmore, P.A. et al., Use of the AN/AQS-20A Tactical Mine-hunting System for On-scene Bathymetry Data, Journal of Marine Systems, vol. 78, pp. 5425-5432(Feb. 2008).
Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).
Harris, M.M., et al., Tow Vehicle Depth Verification, Oceans 2002 IEEE/MTS Conference Proceedings, pp. 1199-1202 (Oct. 2002).
Streed, C.A., et al., AQS-20 Through-The-Sensor Environmental Data Sharing, Proceedings of the SPIE Defense & Security Symposium (Mar. 2005).
Taylor, W.A., et al., Taking the Man out of the Minefield, Sea Technology 2007, vol. 48, No. 11, pp. 15-19 (Nov. 2007).
Kelly, D., The Scoop on Scanning Sonar, Motor Boating and Sailing, pp. 51, 70-71 (Aug. 1976).
Sosin, M., Can Electronics Make You Almost as Smart as a Fish, Popular Mechanics, pp. 110-111 (Nov. 1976).
WESMAR Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Denny, M., Blip, Ping, and Buzz, JHU Press, 1st ed. (2007).
Flemming, B.W., M. Klein, P.M. Denbigh, Recent Developments in Side Scan Sonar Techniques, (1982).
Hansen, R.E., Introduction to Sonar, Course Material to INF-GEO4310, University of Oslo, (Oct. 7, 2009).
Kurie, F.N.D. Design and Construction of Crystal Transducers, Office of Scientific Research and Development Washington D C., (1946).
Loeser, Harrison T., Sonar Engineering Handbook, Peninsula Publishing (1992).
Medwin, H. et al., Fundamentals of Acoustical Oceanography, Academic Press (1998).
Miller, S.P., Selected Readings in Bathymetric Swath Mapping, Multibeam Sonar System Design, University of California Santa Barbara (Apr. 1993).
Sherman, C. & J. Butler, Transducers and Arrays for Underwater Sound, Springer Sci. & Bus. Media, 1st ed. (2007).
Stansfield, D., High Frequency Designs, Underwater Electroacoustic Transducers: A Handbook for Users and Designers, Bath University Press and Institute of Acoustics (1991).
Urick, R.J., Principles of Underwater Sound, 3rd Edition, McGraw-Hill Book Company, 1983.
Wilson, O.B., An Introduction to the Theory and Design of Sonar Transducers, Navy Postgraduate School, Monterey, California (Jun. 1985).
Woollett, R.S., Sonar Transducer Fundamentals, Scientific and Engineering Studies, Naval Underwater Systems Center (1984).
Bass, G. New Tools for Undersea Archeology, National Geographic, vol. 134, pp. 403-422 (1968).
Chesterman, W.D., Clynick, P.R., and Stride, A.H., An Acoustic Aid to Sea Bed Survey, Acustica, pp. 285-290, Apr. 1958.
Cyr, Reginald, A Review of Obstacle Avoidance/Search Sonars Suitable for Submersible Applications, Marine Tech. Soc. Journal., vol. 20, No. 4, pp. 47-57(Dec. 1986).
Donovan, D.T., Stride, A.H., and Lloyd, A.J., An Acoustic Survey of the Sea Floor South of Dorset and its Geological Interpretation, Philosophical Transactions of the Royal Society of London, Series B, Biological Sciences, pp. 299-330 (Nov. 1961).
Flemming, B.W., Side-Scan Sonar: A Practical Guide, International Hydrographic, pp. 65-92 (Jan. 1976).
Hersey, J. B, et al., Sonar Uses in Oceanography, Presented at Instrument Automation Conference and Exhibit, New York, NY, Sep. 1960.
Hydro Surveys: Side Scan Sonar Systems, Hydro International (2008).
Morang, Andrew, Kucharski, William M., Side-Scan Investigation of Breakwaters at Calumet and Burns Harbors in Southern Lake Michigan, Oceans 86 Conference Record, pp. 458-465, Sep. 1986.
Newman, P., Durrant-Whyte, H., Using Sonar in Terrain-Aided Underwater Navigation, IEEE Proceedings, (May 1998).
Noble, N., The Telltale Sound of Depth, Motor Boating and Sailing, pp. 23-24(Aug. 1976).
Pappalardo, M., Directivity Pattern of a Linear Array Transducer in High Frequency Range, Journal de Physique, pp. 32-34 (Nov. 1972).
Patterson, D.R., and J. Pope, Coastal Applications of Side Scan Sonar, Proceedings of Coastal Structures '83, Mar. 1983.
Onoe, M., and Tiersten, H.F., Resonant Frequencies of Finite Piezoelectric Ceramic Vibrators with High Electromechanical Coupling, IEEE Transactions of Ultrasonics Engineering, pp. 32-39 (Jul. 1963).
Rusby, Stuart, A Long Range Side-Scan Sonar for Use in the Deep Sea (GLORIA PROJECT) Int. Hydrogr. Rev., pp. 25-39 (1970).
Rossing, Thomas D., Sonofusion??, ECHOES: The Newsletter of the Acoustical Society of America, vol. 12, No. 2 (Spring. 2002).
Somers, M.L., and Stubbs, A.R., Sidescan Sonar, IEE Proceedings, pp. 243-256, Jun. 1984.
Spiess, F.N., Acoustic Imaging, Society of Photo-optical Instrumentation Engineers' Seminar-in-Depth on Underwater Photo-optical Instrumentation Applications, pp. 107-115 (Mar. 1971).
Stride, A.H., A Linear Pattern on the Sea Floor and its Interpretation, National Institute of Oceanography, Wormley, Surrey, pp. 313-318 (1959).
Tyce, R.C., Deep Seafloor Mapping Systems A Review, Marine Tech. Soc. Journal., vol. 20, No. 4, pp. 4-16 (Dec. 1986).
Wang, H.S.C., Amplitude Shading of Sonar Transducer Arrays, The Journal of the Acoustical Society of America, pp. 1076-1084, (May. 1975).
Benthien, George W, and Hobbs, Stephen, Technical Report: Modeling of Sonar Transducers and Arrays, Sep. 2005.
Barnum, S.R. CDR, Descriptive Report to Accompany Hydrographic Survey Side, Scan Sonar / Multibeam Survey of Portsmouth Harbor, Survey No. H11014 (2001).
Clausner, J. Coastal Engineering Technical Note: Side Scan Sonar for Inspecting Coastal Structures, CETN-III-16, U.S. Army Engineer Waterways Experiment Station, (Nov. 1983).
Craig, J.D., Engineering and Design: Evaluation and Repair of Concrete Structures, Manual No. 1110-2-2002, US Army Corps of Engineers, Department of the Army (Jun. 1995).
McMillan, Ken, The Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).
Ronhovde, A., High Resolution Beamforming of Simrad EM3000 Bathymetric Multibeam Sonar Data, Cand Scient thesis, University of Oslo, Norway. (Oct. 1999).
Speiss, F.N., and Tyce, R.C., Marine Physical Laboratory Deep Tow Instrumentation System, Deep Submergence Systems Project and Office of Naval Research, Report No. MPL-U-69/72, (Mar. 1973).
Williams, S. Jeffress, Use of High Resolution Seismic Reflection and Side-Scan Sonar Equipment for Offshore Surveys, CETA 82-5, U.S. Army Corps of Engineers Coastal Engineering Research Center (Nov. 1982).
EdgeTech 2000-CSS Integrated Coastal System Subscan Brochure (date unknown).
HyPack Inc,: HyPack Software User Manual (date unknown).
L-3 Communications SeaBeam Instruments Technical Reference: Multibeam Sonar Theory of Operation, (2000).
QPS b.v.,: Qinsy User Manual (Apr. 27, 2004).
SIMRAD Kongsberg EM Series Multibeam Echo Sounder Operators Manual (2000).
Tritech Technical Data Sheet: ROV/AUV Side Scan—Sea King Side Scan Sonar (date unknown).

(56) References Cited

OTHER PUBLICATIONS

Tritech Manual: Starfish Hull Mount Sonar System User Guide (date unknown).

Triton Elics Intl.: ISIS Sonar® User's Manual, vols. 1 and 2 (Jun. 2004).

Vernitron Product Catalog: Modern Piezoelectric Ceramics, Custom Material Product Catalog (date unknown).

Oceanic Imaging Consultants (OIC) Inc.: GeoDAS SDV Geophysical Data Acquisition System Brochure.

SonarWeb Pro [retrieved Feb. 10, 2015]. Via the Internet Archive Wayback Machine at https://web.archive.org/web/20090622013837/http://chesapeaketech.com/prod-webpro.html (Jun. 22, 2009). 4 pages.

Feature Matrix'SonarTRX/-Si/-LSS Sidescan sonar procesing software (Version 13.1—Feb. 20, 2013) [retrieved Feb. 10, 2015]. Retrieved from the Internet: http://www.sonartrx.com/Documents/SonarTRX-FeatureMatrix-1301.pdf (dated Feb. 10, 2015). 2 pages.

Imagenex Technology Corp.; YellowFin SideScan Sonar, (Model 872); user's manual; data storage file format; Ethernet interface specification, and Ethernet setup guide; Nov. 2004; 46 pages.

Office Action for Reexamination No. 90/009,956; dated Apr. 6, 2012; 32 pages.

Office Action for Reexamination No. 90/009,957; dated Jun. 4, 2012; 17 pages.

Office Action for Reexamination No. 90/009,958; dated Jun. 18, 2012; 19 pages.

Office Action for U.S. Appl. No. 11/195,107; dated Feb. 15, 2007; 5 pages.

Office Action for U.S. Appl. No. 11/195,107; dated Aug. 9, 2007; 7 pages.

Office Action for U.S. Appl. No. 11/195,107; dated Mar. 4, 2008; 7 pages.

Office Action for U.S. Appl. No. 11/195,107; dated Jul. 17, 2008; 7 pages.

Office Action for U.S. Appl. No. 11/195,107; dated May 12, 2009; 9 pages.

Office Action for U.S. Appl. No. 12/319,594; dated Jun. 8, 2009; 10 pages.

Office Action for U.S. Appl. No. 12/319,586; dated Sep. 3, 2009; 5 pages.

Office Action for U.S. Appl. No. 12/319,586; dated Mar. 2, 2010; 5 pages.

Office Action for U.S. Appl. No. 12/319,604; dated Sep. 29, 2009; 7 pages.

Office Action for U.S. Appl. No. 12/631,229; dated Sep. 9, 2010; 8 pages.

Response to European Search Report for European Patent Application No. 05782717.2-2220; dated Mar. 23, 2012; Johnson Outdoors, Inc.; 35 pages.

International Search Report for Application No. PCT/US05/27436 dated Nov. 20, 2007; 1 page.

International Preliminary Report on Patentability for Application No. PCT/US05/27436 dated Dec. 6, 2007; 5 pages.

Translation of Notice of Reason(s) for Rejection for Japanese Application No. 2007-524919 dated Aug. 16, 2011; 4 pages.

Communication [extended European Search Report] for European Application No. 05782717.2-2220 dated Aug. 31, 2011; 12 pages.

Communication for European Patent Application No. 05782717.2-2220 dated May 11, 2012; 9 pages.

Australian Government, Department of Sustainability, Environment, Water, Population and Communities; Fact Sheet—The RV Tangaroa; date unknown; 3 pages.

Blondel, Philippe; The Handbook of Sidescan Sonar; © 2009; 316 pages.

Calcutt, Ron; Lowrance Book of Sonar & GPS; © 1986; and Lowrance Book of Sonar & GPS Update; 1997; collectively 122 pages.

Derrow, II, Robert W. et al., A Narrow-Beam, Side-Looking Sonar for Observing and Counting Fish in Shallow Aquaculture Ponds; 1996; 34 pages.

DSME E&R Ltd.; Remotely Operated Sonar Boat System (SB-100S); http://dsmeu.en.ec21.com/Remotely_Operated_Sonar_Boat_System-618904_2479905.html; printed on Feb. 12, 2010; 3 pages.

Eagle Electronics; Ultra 3D Installation and Operation Manual; © 2002; 24 pages.

Furuno Electric Co., Ltd.; Side Looking Sonar, Model SL-16, 1983; 4 pages.

Geoacoustics; GeoPulse, Profiler System; Feb. 2006, 2 pages.

Humminbird 1198C Review for Catfishing, Catfishing "How To" Catfishing Techniques, Oct. 31, 2011, 9 pages.

Imagenex Technology Corp., Model 881 SportScan, Single or Dual Frequency Digital Sidescan Sonar, Software User's Manual; May 9, 2003; 16 pages.

Klein Associates, Inc.; Modular Side Scan Sonar and Sub-Bottom Profiler System Components for Customized Configurations; date unknown; 10 pages.

Klein, Martin; Side Scan Sonar; UnderSea Technology; Apr. 1967; 4 pages.

Klein, M. et al., Sonar—a modern technique for ocean exploitation; IEEE Spectrum; Jun. 1968; pp. 40-46 and Authors page.

Klein, Martin; New Developments in Side Scan Sonar for Hydrography; date unknown; 14 pages.

Klein, Martin; Side Scan Sonar; Offshore Services; Apr. 1977, pp. 67, 68, 71, 72, 75.

Klein, Martin; New Capabilities of Side Scan Sonar Systems; date unknown; pp. 142-147.

Klein, Martin; Sea Floor Investigations Using Hybrid Analog/Digital Side Scan Sonar; date unknown; 18 pages.

Kongsberg Maritime AS; Side Looking Transducer, 200 kHz—0.5x49, 200 kHz side looking transducer for shallow water and surveying and high resolution; date unknown; 2 pages.

Kongsberg Simrad AS; ConCat Containerised Catamaran, Inshore hydrographic survey vessel that fits in a container, Rev. B, Apr. 2004; 4 pages.

Kvitek, Rikk et al.; Final Report, Early Implementation of Nearshore Ecosystem Database Project Tasks 2 and 3; http://seafloor.csumb.edu/taskforce/html%202%20web/finalreport.htm; Jul. 29, 1999; 92 pages.

Law, G., Sideways Glance, Side- and down-scan Imaging Open New Windows in Fishing Finding, Electronics, Nov. 2011, pp. 28-29.

Leonard, John L.; Cooperative Autonomous Mobile Robots; date unknown; 11 pages.

Maritime surveys takes delivery of SeaBat 8160; Sea Technology, Jul 2001; http://findarticles.com/p/articles/mi_qa5367/is_200107/ai_n21475675/; webside printed Jun. 30, 2010.

Marine Sonic Technology, Ltd.; Sea Scan® PC Side Scan Sonar System Information/Specifications Sheet; Sep. 9, 2002; 10 pages.

Mesotech; Mesotech Model 971 Sonar System Summary; Mar. 26, 1985, 2 pages.

Oughterson, B., Sophisticated Sonar Reveals Detailed Images Recently Unimaginable. Is It Too Much too Soon?, Is it Too Much Too Soon?, Basic Instincts, pp. 75-78.

Raymarine, L750 Fishfinder, Operation Handbook; date unknown; 93 pages.

Raytheon Marine Company; Installation Instructions; Oct. 1998; 2 pages.

Remtechsroy Group; Side Scan Sonar-Remotely Operated Vehicle Surface; http://remtechnology.en.ec21.com/Side_Scan_Sonar_Remotely_Operated-2902034_2902230.html; printed on Feb. 12, 2010; 4 pages.

RESON Inc.; SeaBat 8101 Product Specification, 240kHz Multibeam Echo Sounder; © 1999; 2 pages.

RESON; SeaBat 8101; Multibeam acoustic echosounder; date unknown; 1 page.

(56) References Cited

OTHER PUBLICATIONS

RESON; SeaBat 8160 Product Specification, Multibeam Echosounder System; date unknown; 2 pages.
Russell-Cargill, W.G.A. ed.; Recent Developments in Side Scan Sonar Techniques; © 1982; 141 pages.
Simrad; Product Specifications, Simrad EA 500 Side-looking Option; Feb. 1992, 1 page.
Techsonic Industries, Inc., Humminbird Wide fish wide open!; brochure, 1997, 4 pages.
Techsonic Industries, Inc.; Humminbird GPS brochure; © 1992; 10 pages.
Teleflex Electronic Systems; Humminbird 1997; © 1996; 24 pages.
The Norwegian and Finnish navies performing operations with the Kongsberg Hugin AUV and minesniper mine disposal vehicle in Finnish waters; FFU nytt; No. 3, Nov. 2003; p. 12.
Trabant, Peter K.; Applied High-Resolution Geophysical Methods, Offshore Geoengineering Hazards; © 1984; 265 pages.
Tritech International Limited; StarFish; 450H Hull-Mounted Sidescan System; date unknown; 2 pages.
Universal Sonar Limited; High Frequency Broad Band Line Array Type G27/300LQ; date unknown 2 pages.
Williams, J. P., *Glancing Sideways, Nautical Know-How*, Chesapeake Bay Magazine, May 2011, pp. 14-17.
Green, J. "Maritime Archaeology: A Technical Handbook". 2nd Edition. Academic Press; May 19, 2004, pp. 1-468.

\* cited by examiner

SIDE VIEW:

TOP VIEW:

SONAR ASSEMBLY FOR REDUCED INTERFERENCE

FIELD OF THE INVENTION

Embodiments of the present invention relate generally to sonar systems and, more particularly, to a sonar assembly configured for reduced interference between the elements of the transducer used for transmitting and receiving the sonar signal.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be displayed in graphical form on a display device, giving the user a "picture" of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Since the development of sonar, display technology has also been improved in order to enable better interpretation of sonar data. Strip chart recorders and other mechanical output devices have been replaced by, for example, digital displays such as LCDs (liquid crystal displays). Current display technologies continue to be improved in order to provide, for example, high quality sonar data on multi-color, high resolution displays having a more intuitive output than early sonar systems were capable of producing. Accordingly, it is desirable to provide improved sonar systems for better image quality.

BRIEF SUMMARY OF THE INVENTION

With display capabilities advancing to the point at which richly detailed information is able to be displayed, attention has turned back to the transducer assembly in order to provide higher quality data for display. Furthermore, additional uses have been developed for sonar systems as transducer and display capabilities have evolved. For example, sonar systems have been developed to assist fishermen in identifying fish and/or the features that tend to attract fish. Historically, these types of sonar systems primarily analyzed the column of water beneath a watercraft with a cylindrical piezo element that produces a conical beam, known as a conical beam transducer or simply as a circular transducer (referring to the shape of the face of the cylindrical element). However, the advent of sidescan sonar technology enabled viewing of not only the column of water beneath their vessel, but also the underwater environment to either side of their vessel.

Some sonar systems have been implemented with multiple transducer elements, including a transducer element facing generally downward (e.g., downscan) and one or more transducer elements facing generally to the side (e.g., sidescan). Such systems have enabled advanced sonar returns and, ultimately, enhanced image quality. However, multi-beam sonar systems typically require very complex systems to support the plurality of transducers that are employed in order to form the multi-beam sonar system. Additionally, such multi-transducer element sonar systems often result in the presence of interference between the transducer elements. For example, the sound waves created by one of the sidescan transducer elements may interfere with the sound waves produced by the downscan transducer element, or vice versa. Such interference may negatively affect the display quality of the sonar returns.

Accordingly, embodiments of the present invention provide a sonar system that produces quality images with substantially reduced interference. In an example embodiment, a transducer assembly is provided. The transducer assembly comprises a housing mountable to a water craft capable of traversing a surface of a body of water. The transducer assembly further comprises a linear downscan transmit/receive transducer element positioned within the housing and aimed downwardly. The linear downscan transmit/receive transducer element is configured to transmit sonar pulses in the form of a fan-shaped beam in at least a direction substantially perpendicular to a plane corresponding to the surface of the body of water, and is further configured to receive sonar returns from the sonar pulses and convert sound energy of the sonar returns into downscan sonar return data in the form of electrical signals representative of the sound energy. The transducer assembly further comprises at least one sidescan receive-only transducer element positioned within the housing and aimed outwardly and downwardly. The at least one sidescan receive-only transducer element is configured to receive sonar returns from the sonar pulses and convert sound energy of the sonar returns into sidescan sonar return data in the form of electrical signals representative of the sound energy.

In some embodiments, the transducer assembly further comprises transmitter circuitry in communication with the linear downscan transmit/receive transducer element. The transmitter circuitry may be configured to transfer a transmit signal to the linear downscan transmit/receive transducer element to cause the linear downscan transmit/receive transducer element to transmit the sonar pulses. The transducer assembly may further comprise receiver circuitry in communication with the linear downscan transmit/receive transducer element and the at least one sidescan receive-only transducer element. The receiver circuitry may be configured to transfer said sonar return data from the linear downscan transmit/receive transducer element and the at least one sidescan receive-only transducer element for processing and generation of sonar image data for display to a user.

In some embodiments, the linear downscan transmit/receive transducer element may define a substantially rectangular shape with a top surface, bottom surface, and opposing side surfaces. The transducer assembly may further comprise a sound-attenuating material configured to substantially attenuate transmission of sonar pulses therethrough. The sound-attenuating material may be positioned proximate to the top surface of the linear downscan transmit/receive transducer element, the opposing sides and bottom surface being free of the sound-attenuating material such that the linear downscan transmit/receive transducer element is configured to transmit sonar pulses from the bottom surface and opposing side surfaces without transmitting sonar pulses from the top surface. Additionally, the transducer assembly may further comprise a shield configured to substantially attenuate transmission of sonar pulses therethrough. The shield may be positioned adjacent to the sound-attenuating material proximate to the top surface of the linear downscan transmit/receive transducer element, the opposing sides and bottom surface being free of the shield.

In some embodiments the at least one sidescan receive-only transducer element may comprise a different material than the linear downscan transmit/receive transducer element. The at least one sidescan receive-only transducer element may comprise a first sidescan receive-only transducer element and a second sidescan receive-only transducer element.

In another example embodiment, a sonar system is provided. The sonar system comprises a housing mountable to a water craft capable of traversing a surface of a body of water. The sonar system further comprises a linear downscan transmit/receive transducer element positioned within the housing and aimed downwardly. The linear downscan transmit/receive transducer element is configured to transmit sonar pulses in the form of a fan-shaped beam in at least a direction substantially perpendicular to a plane corresponding to the surface of the body of water, and is further configured to receive sonar returns from the sonar pulses and convert sound energy of the sonar returns into downscan sonar return data in the form of electrical signals representative of the sound energy. The sonar system further comprises at least one sidescan receive-only transducer element positioned within the housing and aimed outwardly and downwardly. The at least one sidescan receive-only transducer element is configured to receive sonar returns from the sonar pulses and convert sound energy of the sonar returns into sidescan sonar return data in the form of electrical signals representative of the sound energy. The sonar system further comprises a processor configured to receive said sonar return data and generate sonar image data for display to a user.

In some embodiments, the sonar system may further comprise transmitter circuitry in communication with the linear downscan transmit/receive transducer element. The transmitter circuitry may be configured to transfer a transmit signal to the linear downscan transmit/receive transducer element to cause the linear downscan transmit/receive transducer element to transmit the sonar pulses. The sonar system may further comprise receiver circuitry in communication with the linear downscan transmit/receive transducer element and the at least one sidescan receive-only transducer element. The receiver circuitry may be configured to transfer said sonar return data from the linear downscan transmit/receive transducer element and the at least one sidescan receive-only transducer element to the processor.

In some embodiments, the linear downscan transmit/receive transducer element may define a substantially rectangular shape with a top surface, bottom surface, and opposing side surfaces. The sonar system may further comprise a sound-attenuating material configured to substantially attenuate transmission of sonar pulses therethrough. The sound-attenuating material may be positioned proximate to the top surface of the linear downscan transmit/receive transducer element, the opposing sides and bottom surfaces being free of the sound-attenuating material such that the linear downscan transmit/receive transducer element is configured to transmit sonar pulses from the bottom surface and opposing side surfaces without transmitting sonar pulses from the top surface. Additionally, the sonar system may further comprise a shield configured to substantially attenuate transmission of sonar pulses therethrough. The shield may be positioned adjacent to the sound-attenuating material proximate to the top surface of the linear downscan transmit/receive transducer element, the opposing sides and bottom surfaces being free of the shield.

In some embodiments, the at least one sidescan receive-only transducer element may comprise a different material than the linear downscan transmit/receive transducer element. The at least one sidescan receive-only transducer element may comprise a first sidescan receive-only transducer element and a second sidescan receive-only transducer element.

In yet another example embodiment, a method is provided. The method comprises transmitting sonar pulses from a linear downscan transmit/receive transducer element positioned within a housing mountable to a water craft capable of traversing a surface of a body of water. Each of the sonar pulses is transmitted as a fan-shaped beam in at least a direction substantially perpendicular to a plane corresponding to the surface of the body of water. The method further comprises receiving sonar returns from the sonar pulses with the linear downscan transmit/receive transducer element. The linear downscan transmit/receive transducer element is configured to convert sound energy of the sonar returns into downscan sonar return data in the form of electrical signals representative of the sound energy. The method further comprises receiving sonar returns from the sonar pulses with at least one sidescan receive-only transducer element. The sidescan receive-only transducer element is configured to convert sound energy of the sonar returns into sidescan sonar return data in the form of electrical signals representative of the sound energy. The method further comprises processing, by a processor, the downscan sonar return data received from the linear downscan transmit/receive transducer element and the sidescan sonar return data received from the at least one sidescan transducer receive-only element to produce sonar image data for display to a user.

In some embodiments, the method may further comprise transferring a transmit signal through transmitter circuitry in communication with the linear downscan transmit/receive transducer element to cause the linear downscan transmit/receive transducer element to transmit the sonar pulses. The method may further comprise transferring the downscan sonar data indicative of the sonar returns received by the linear downscan transmit/receive transducer element through a first receiver circuitry in communication with the linear downscan transmit/receive transducer element to the processor. The method may further comprise transferring the sidescan sonar data indicative of the sonar returns received by the at least one sidescan transducer receive only element through a second receiver circuitry in communication with the at least one sidescan transducer receive only element to the processor.

In some embodiments, transmitting sonar pulses from the linear downscan transmit/receive transducer element may comprise transmitting sonar pulses from a bottom surface and opposing side surfaces without transmitting sonar pulses from a top surface of the linear downscan transmit/receive transducer element. A sound-attenuating material may be positioned proximate to the top surface of the linear downscan transmit/receive transducer element. The sound-attenuating material is configured to substantially attenuate transmission of sonar pulses therethrough.

In some embodiments, receiving sonar returns from the sonar pulses with the at least one sidescan receive-only transducer element may comprise receiving sonar returns from the sonar pulses with a first sidescan receive-only transducer element and a second sidescan receive-only transducer element.

In another example embodiment, a transducer assembly is provided. The transducer assembly comprises a housing mountable to a water craft capable of traversing a surface of a body of water. The transducer assembly further comprises a linear downscan transducer element positioned within the housing and aimed downwardly. The linear downscan transducer element is configured to transmit sonar pulses. The linear transducer element defines a substantially rectangular shape with a top surface, bottom surface, and opposing side surfaces. The transducer assembly further comprises a sound-attenuating material configured to substantially attenuate transmission of sonar pulses therethrough. The sound-attenuating material is positioned proximate to the top surface of the linear transducer element, the opposing sides and bottom surface being free of the sound-attenuating material such that the linear transducer element is configured to transmit sonar pulses from the bottom surface and opposing side surfaces without transmitting sonar pulses from the top surface.

In some embodiments, the transducer assembly may further comprise a shield configured to substantially attenuate transmission of sonar pulses therethrough. The shield may be positioned adjacent to the sound-attenuating material proximate to the top surface of the linear downscan transducer element, the opposing sides and bottom surface being free of the shield.

In some embodiments, the linear downscan transducer element may comprise a linear downscan transmit/receive transducer element configured to transmit sonar pulses in the form of a fan-shaped beam in at least a direction substantially perpendicular to a plane corresponding to the surface of the body of water. The linear downscan transmit/receive transducer element may be further configured to receive sonar returns from the sonar pulses and convert sound energy of the sonar returns into downscan sonar return data in the form of electrical signals representative of the sound energy. The transducer assembly may further comprise at least one sidescan receive-only transducer element positioned within the housing and aimed outwardly and downwardly. The at least one sidescan receive-only transducer element may be configured to receive sonar returns from the sonar pulses and convert sound energy of the sonar returns into sidescan sonar return data in the form of electrical signals representative of the sound energy.

In some embodiments, the transducer assembly may further comprise transmitter circuitry in communication with the linear downscan transmit/receive transducer element. The transmitter circuitry may be configured to transfer a transmit signal to the linear downscan transmit/receive transducer element to cause the linear downscan transmit/receive transducer element to transmit the sonar pulses. The transducer assembly may further comprise receiver circuitry in communication with the linear downscan transmit/receive transducer element and the at least one sidescan receive-only transducer element. The receiver circuitry may be configured to transfer said sonar return data from the linear downscan transmit/receive transducer element and the at least one sidescan receive-only transducer element for processing and generation of sonar image data for display to a user.

In some embodiments, the at least one sidescan receive-only transducer element may comprise a different material than the linear downscan transmit/receive transducer element. The at least one sidescan receive-only transducer element may comprise a first sidescan receive-only transducer element and a second sidescan receive-only transducer element.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
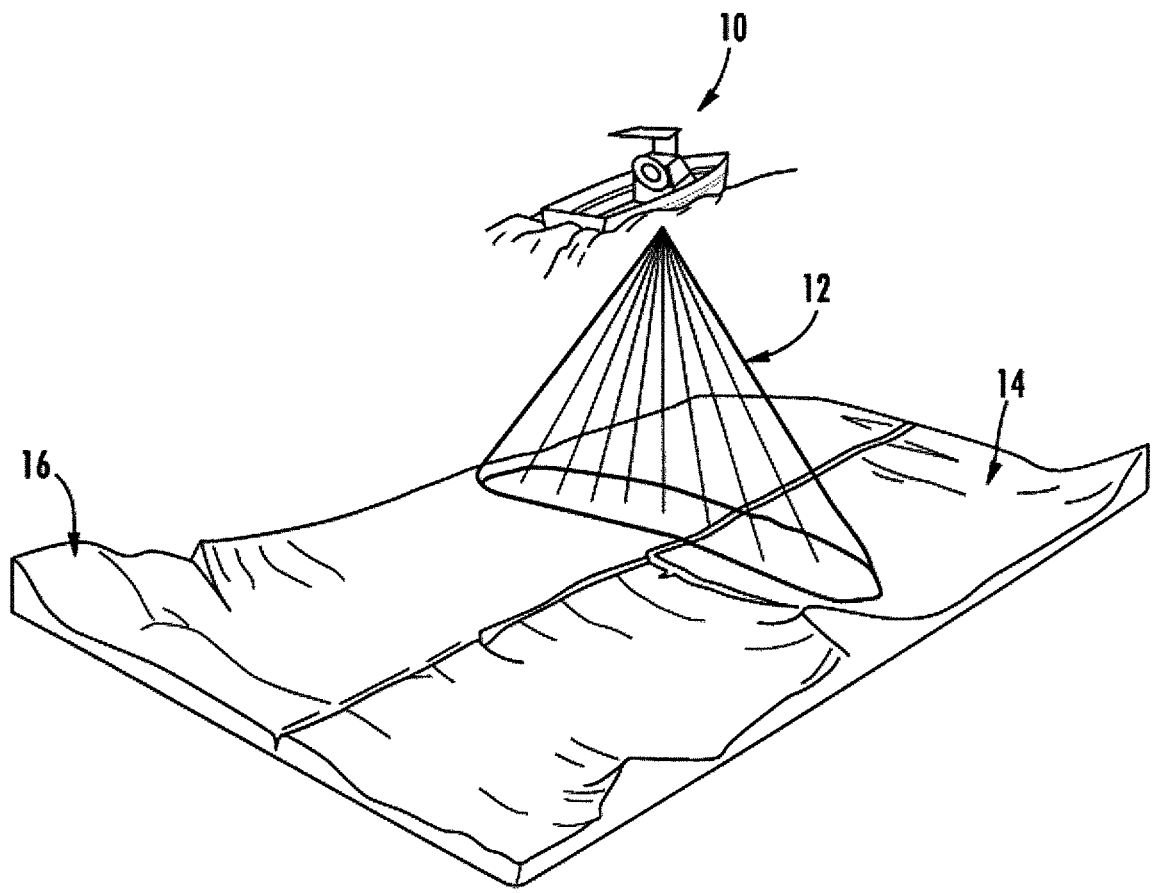
FIG. 1 is a diagram illustrating an example of a sonar transducer emitting sonar pulses from a boat.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a boat 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more rectangular transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echos or sonar returns may strike the transducer (or, in some cases, a separate receiver element), which converts the echos back into an electrical signal which is processed by a processor (e.g., sonar signal processor 32 shown in FIG. 2) and sent to a display (e.g., an LCD) mounted in the cabin or other convenient location in the boat. This process is often called "sounding". Since the speed of sound in water is constant (approximately 4800 feet per second in fresh water), the time lapse between the transmitted signal and the received echos can be measured and the distance to the objects determined. This process repeats itself many times per second. The results of many soundings are used to build a picture on the display of the underwater world.

For example, the sound waves 12 may bounce off the floor 14 of the body of water and reflect back to the boat, thereby indicating a depth of the water at that location. Sometimes, the floor 14 may have an uneven topography (e.g., a raised surface 16) that may reflect different depths of the water at different locations. In such a circumstance, the sound waves 12 reflect off the various floor surfaces and back to the boat 10. If the raised surface 16 is closer to the boat 10, the sound waves 12 will reach the boat 10 faster and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

The active element in a transducer may comprise at least one man-made crystal (e.g., lead zirconate or barium titanate). A conductive coating is applied to sides of the crystal. Wires are soldered to these coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. For round crystals, the thickness determines its frequency and the diameter determines the cone angle or angle of coverage. For example at 200 kHz, a 20 degree cone angle crystal is approximately one inch in diameter, whereas an eight degree cone requires a crystal that is about two inches in diameter. Sometimes it is desirable to have coverage which is wide in one direction (x axis) but narrow in the perpendicular direction (y axis). This fan shaped beam is usually produced by a rectangular element or an elliptical element (e.g., an element with an appropriate length to width ratio). Moreover, in some embodiments, more than one transducer may be used to create increased or enhanced sound wave coverage. Likewise, in some embodiments, more than one crystal may be used to create increased or enhanced sound wave coverage. Further information regarding creation of sound energy by differently shaped transducer elements may be found in the article "ITC Application Equations for Underwater Sound Transducers", which was published by International Transducer Corporation in 1995, Rev. 8/00, which is hereby incorporated by reference in its entirety.

Frequencies used by sonar devices vary but the most common ones range from 50 KHz to over 900 KHz depending on application. Some sonar systems vary the frequency within each sonar pulse using "chirp" technology. These frequencies are in the ultrasonic sound spectrum and are inaudible to humans.

Figure 2:
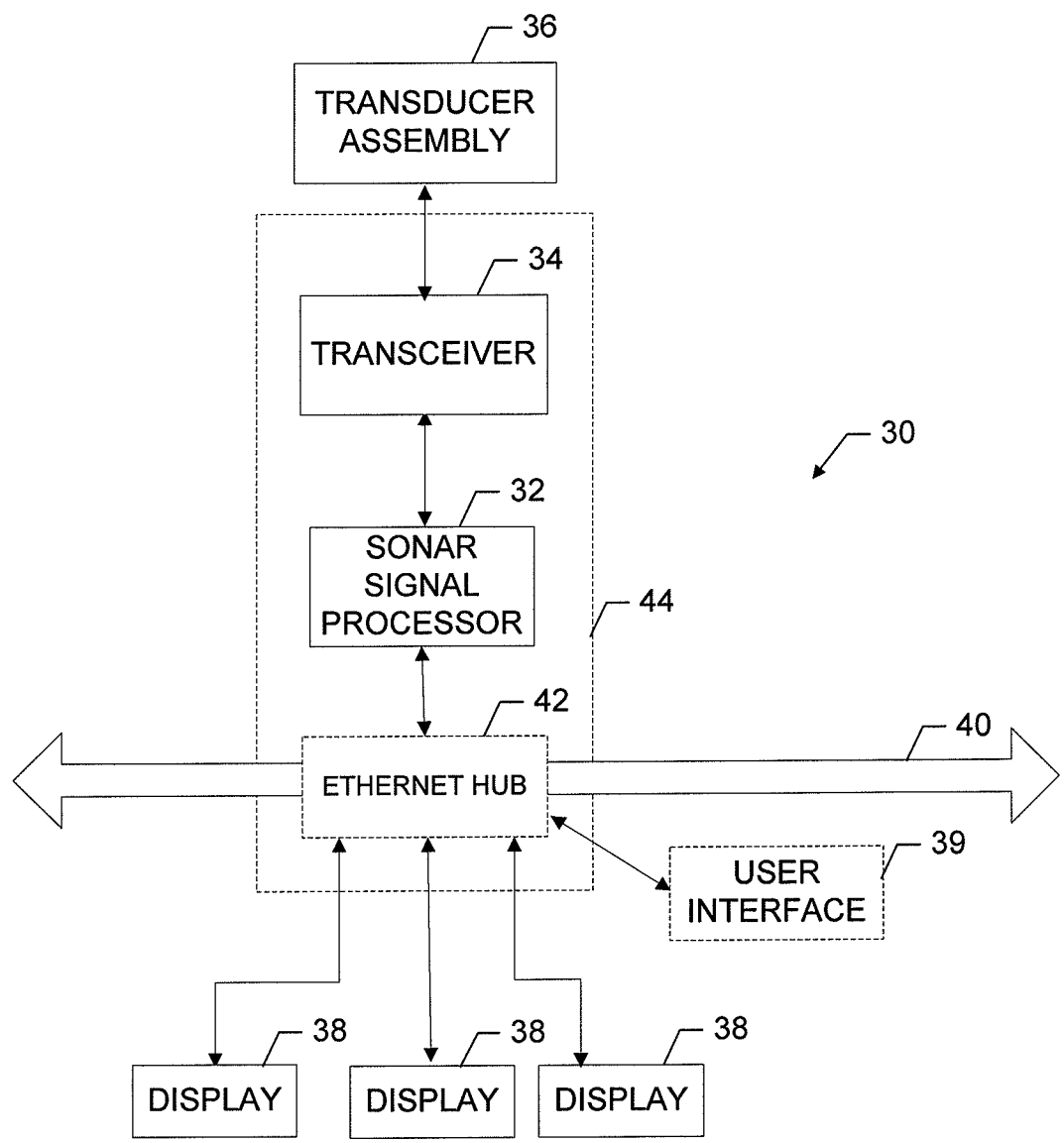
FIG. 2 is a basic block diagram illustrating a sonar system, in accordance with example embodiments described herein.

FIG. 2 is a basic block diagram illustrating a sonar system 30 capable for use with multiple example embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer assembly 36 and/or numerous other peripheral devices such as one or more multi-function displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. The network may also support other data sources, including GPS, autopilot, engine data, compass, radar, etc.

The display 38 may be configured to display images and may include or otherwise be in communication with a user interface 39 configured to receive an input from a user. The display 38 may be, for example, a conventional LCD (liquid crystal display), a touch screen display, or any other suitable display known in the art upon which images may be rendered. Although each display 38 of FIG. 2 is shown as being connected to the sonar signal processor 32 via the network and/or via an Ethernet hub, the display 38 could alternatively be in direct communication with the sonar signal processor 32 in some embodiments, or the display 38, sonar signal processor 32 and user interface 39 could be in a single housing. The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

In an example embodiment, the sonar signal processor 32, the transceiver 34 and an Ethernet hub 42 or other network hub may form a sonar module 44. As such, for example, in some cases, the transducer assembly 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device drivers accessible to the Ethernet hub 42 to enable the Ethernet hub 42 to properly work with displays for which the sonar module 44 is compatible. The sonar module 44 may also be enabled to be upgraded with additional device drivers or transceivers to enable expansion of the numbers and types of devices with which the sonar module 44 may be compatible. In some cases, the user may select a display type to check whether a display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. For example, the sonar signal processor 32 may be configured to receive sonar return data and process the sonar return data to generate sonar image data for display to a user (e.g., on display 38). Moreover, in some embodiments, the sonar signal processor 32 may be configured to receive downscan sonar return data and sidescan sonar return data for processing and generation of sonar image data for display to a user.

In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry (e.g., transmitter circuitry 71 shown in FIG. 2A) for providing one or more transmission electrical signals to the transducer assembly 36 for conversion to sound pressure signals based on the provided electrical signals to be transmitted as a sonar pulse. The transceiver 34 may also include (or be in communication with) circuitry (e.g., receiver circuitry 72 shown in FIG. 2A) for receiving one or more electrical signals produced by the transducer assembly 36 responsive to sound pressure signals received at the transducer assembly 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns. In some embodiments, the transmitter circuitry 71 and/or receiver circuitry 72 may be positioned within the transceiver 34 or sonar module 44. In other embodiments the transmitter circuitry 71 and/or receiver circuitry 72 may be positioned within the transducer assembly 36. Likewise, in some embodiments, the transmitter circuitry 71 and/or receiver circuitry 72 may be positioned separate from the transducer assembly 36 and transceiver 34/sonar module 44.

The transducer assembly 36 according to an exemplary embodiment may be provided in one or more housings that provide for flexible mounting with respect to a hull of the vessel on which the sonar system 30 is employed. In this regard, for example, the housing may be mounted onto the hull of the vessel or onto a device or component that may be attached to the hull (e.g., a trolling motor or other steerable device, or another component that is mountable relative to the hull of the vessel), including a bracket that is adjustable on multiple axes, permitting omnidirectional movement of the housing.

The transducer assembly 36 may include one or more transducer elements positioned within the housing, as described in greater detail below. In some embodiments, each of the transducer elements may be positioned within the housing so as to point toward a different area under or to the side of the vessel. For example, some example transducer assemblies (e.g., shown in FIG. 5 or FIG. 8) are configured such that the transducer elements are oriented within the housing such that one transducer element faces generally downwardly (e.g., a downscan transducer element) and two other transducer elements face generally outwardly and downwardly (e.g., sidescan transducer elements).

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired.

In some embodiments, the transducer assembly 36 may comprise a combination of transducer elements that are configured to transmit sonar pulses and receive sonar returns and transducer elements that are configured to receive sonar returns only. For example, with reference to FIG. 2A, the transducer assembly 36 may comprise a first transducer element 66, a second transducer element 62, and a third transducer element 64.

In some embodiments, the first transducer element 66 may be configured as a transmit/receive transducer element. Such a transmit/receive transducer element may be configured to transmit sonar pulses and be configured to receive sonar returns. Additionally, the transmit/receive transducer element may be configured to convert sound energy of the sonar returns into sonar return data in the form of electrical signals representative of the sound energy. For example, in the depicted embodiment of FIG. 2A, the transceiver 34 and/or sonar signal processor 32 may be configured to transfer a transmit signal to the first transducer element 66 to cause the first transducer element 66 to transmit sonar pulses. In some embodiments, the transmit signal may be transferred through transmitter circuitry 71. However, being a transmit/receive transducer element, the first transducer element 66 is also configured to transfer sonar return data to the transceiver 34 and/or sonar signal processor 32 for processing and generation of sonar image data for display to a user (e.g., with display 38). In some embodiments, the sonar return data may be transferred to the transceiver/processor through receiver circuitry 72.

Figure 2A:
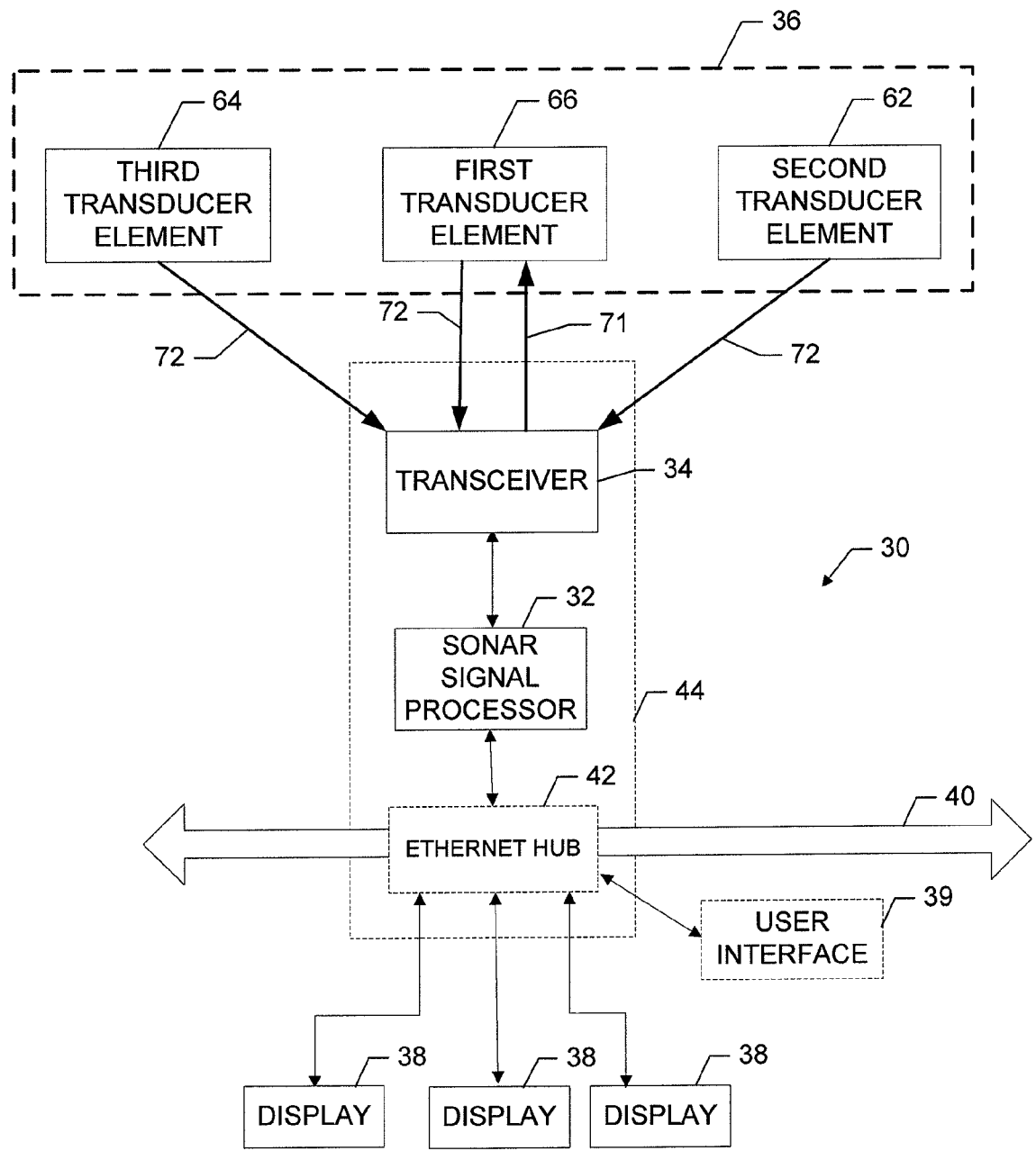
FIG. 2A is a basic block diagram illustrating another sonar system, in accordance with example embodiments described herein.

In some embodiments, the second and third transducer elements 62, 64 may be configured as receive-only transducer elements. Such a receive-only transducer element may be configured to receive sonar returns without transmitting sonar pulses. In particular, the receive-only transducer element may be configured to receive sonar returns from sonar pulses (e.g., the sonar pulses transmitted by the first transducer element 66) and convert the sound energy of the sonar returns into sonar return data in the form of electrical signals representative of the sound energy. For example, in the depicted embodiment of FIG. 2A, the second transducer element 62 and the third transducer element 64 are configured to transfer sonar return data to the transceiver 34 and/or sonar signal processor 32 for processing and generation of sonar image data for display to a user (e.g., with display 38). In some embodiments, the sonar return data may be transferred to the transceiver/processor through receiver circuitry 72. Thus, in some embodiments, a receive-only transducer element may be in communication with the transceiver/processor through receiver circuitry 72 only and may not be in communication with the transceiver/processor through transmitter circuitry 71. A further example of a transducer assembly consistent with the transducer assembly 36 shown in FIG. 2A is shown and described with respect to FIG. 8.

In other embodiments, the transducer assembly 36 may comprise any combination or any number of transducer elements configured to transmit sonar pulses and/or receive sonar returns (e.g., 4 receive-only and 1 transmit/receive transducer elements, 2 receive-only and 2 transmit/receive transducer elements, etc.). Moreover, the transducer elements may be configured in any orientation with respect to each other. For example, a transducer assembly may comprise two sidescan transducer elements configured as transmit/receive transducer elements and one downscan transducer element configured as a receive-only transducer element.

Figure 2B:
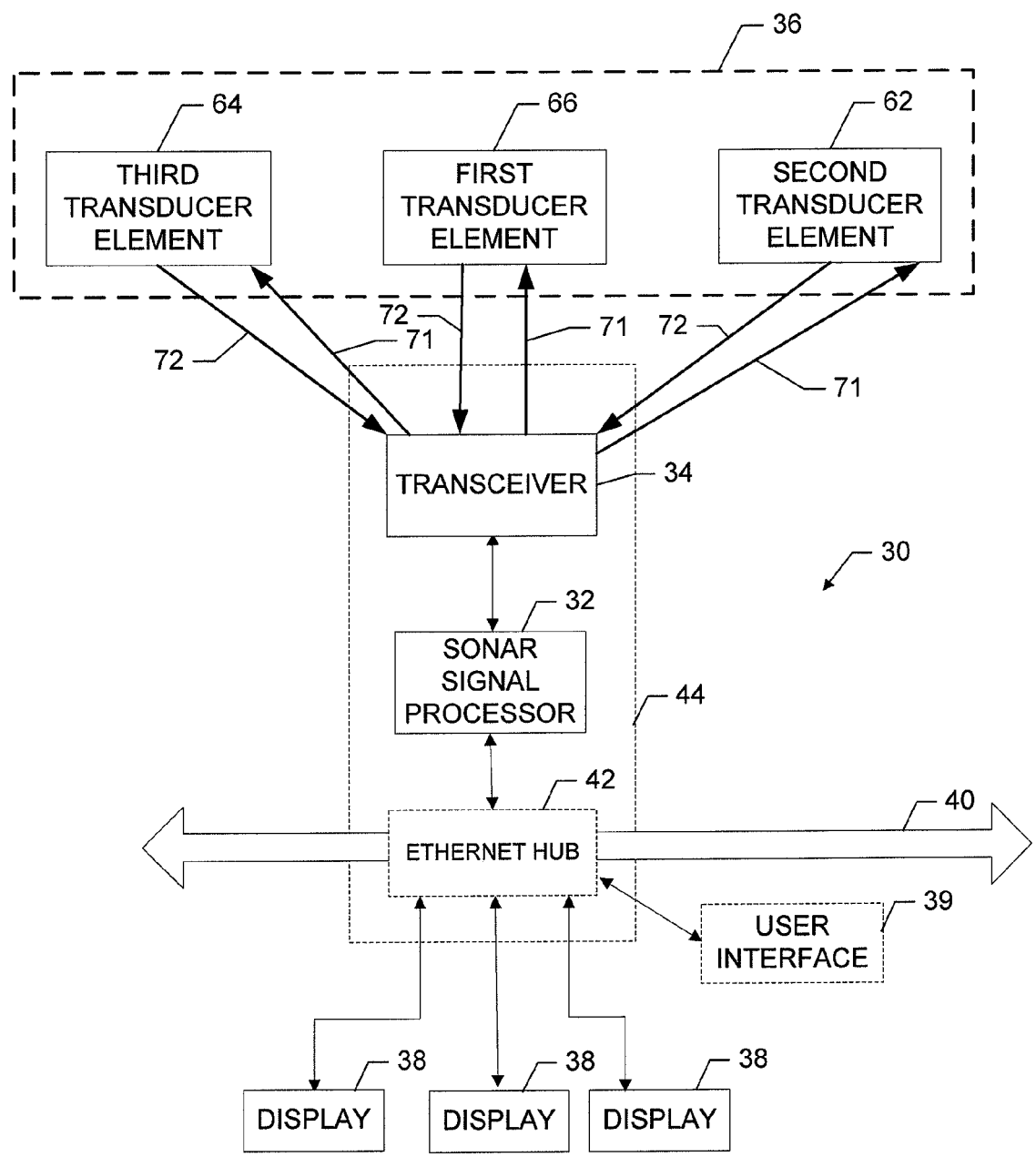
FIG. 2B is a basic block diagram illustrating another sonar system, in accordance with example embodiments described herein.

In some embodiments, the transducer assembly 36 may comprise one or more transducer elements 60, each being configured to transmit sonar pulses and receive sonar returns. For example, with reference to an embodiment shown in FIGS. 5, 6A, and 6B, the transducer assembly 96 may comprise a first transducer element 66', a second transducer element 62', and third transducer element 64' configured to transmit sonar pulses and receive sonar returns. An example schematic of such a transducer assembly is shown in FIG. 2B.

Figure 3:
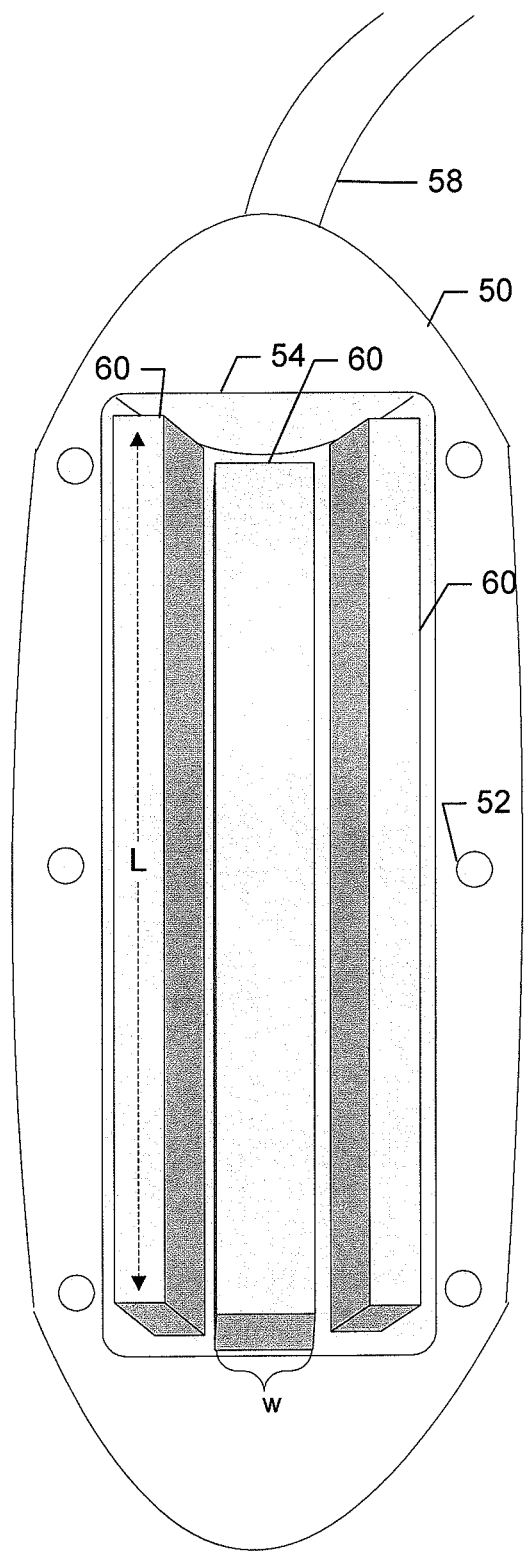
FIG. 3 is a diagram illustrating a more detailed view of a transducer assembly, in accordance with example embodiments described herein.

FIG. 3 is a diagram illustrating a more detailed view of a transducer assembly 36 according to an example embodiment. As shown in FIG. 3, the transducer assembly 36 may include a housing 50 that may include mounting holes 52 through which screws, rivets, bolts or other mounting devices may be passed in order to fix the housing 50 to a mounting bracket, a device attached to a vessel or to the hull of the vessel itself. However, in some cases, the housing 50 may be affixed by welding, adhesive, snap fit or other coupling means. The housing 50 may be mounted to a portion of the vessel, or to a device attached to the vessel, that provides a relatively unobstructed view of both sides of the vessel. Thus, for example, the housing 50 may be mounted on or near the keel (or centerline) of the vessel, on a fixed or adjustable mounting bracket that extends below a depth of the keel (or centerline) of the vessel, or on a mounting device that is offset from the bow or stern of the vessel.

The housing 50 may include a recessed portion defining containment volume 54 for holding transducer elements 60

Figure 5:
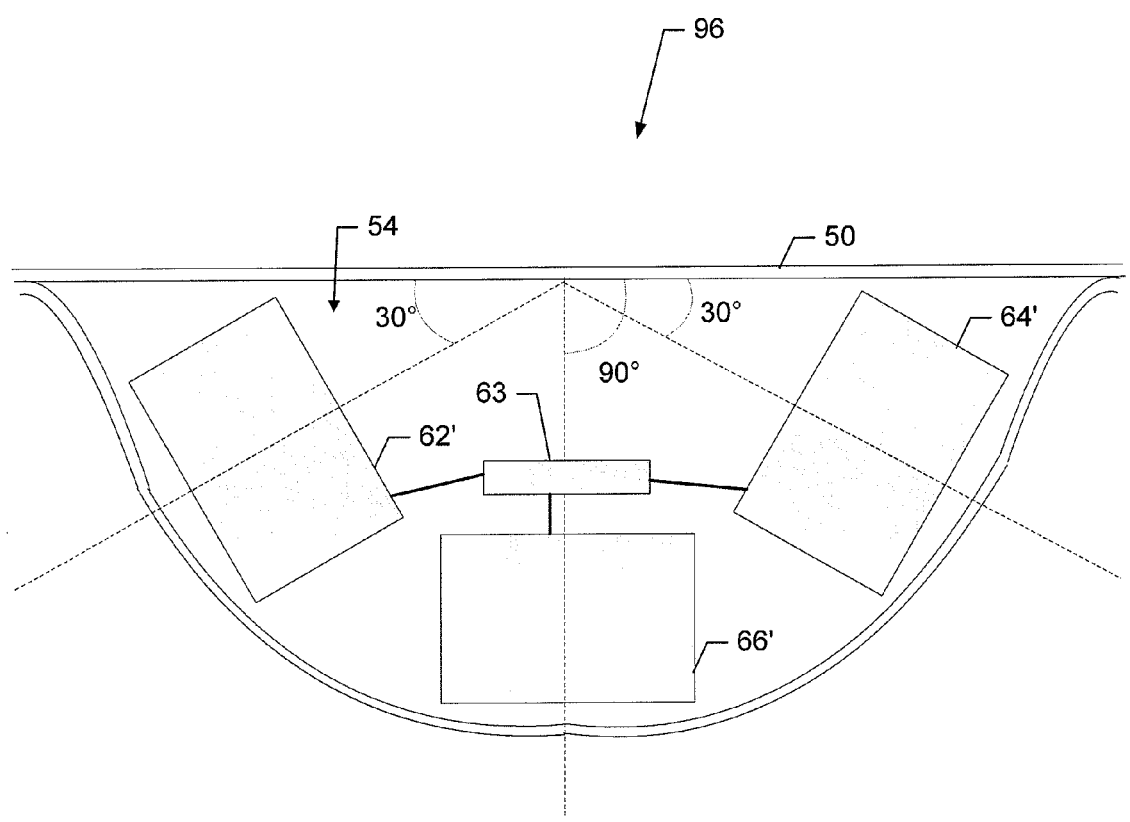
FIG. 5 is a diagram illustrating a cross section of components in a containment volume of a housing for a transducer assembly, in accordance with example embodiments described herein.

(e.g., in FIG. 5, the first, second, and third transducer elements 66', 62', 64'). The recessed portion defining the containment volume may extend away from the hull of the vessel on which the housing 50 is mounted and therefore protrude into the water on which the vessel operates (or in which the vessel operates in a case where the transducer assembly 36 is mounted to a tow fish or other submersible device). To prevent cavitation or the production of bubbles due to uneven flow over the housing 50, the housing 50 (and in particular the containment volume portion of the housing) may have a gradual, rounded or otherwise streamlined profile to permit laminar flow of water over the housing 50. In some examples, an insulated cable 58 may provide a conduit for wiring (e.g., transmitter circuitry 71 or receiver circuitry 72) to couple each of the transducer elements 60 to the sonar module 44.

The shape of a transducer element largely determines the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a linear transducer element made of piezoelectric material, other shapes and types of material are applicable to embodiments of the present invention.

In some embodiments, each of the transducer elements 60 may be a linear transducer element. Thus, for example, each of the transducer elements 60 may be substantially rectangular in shape and made from a piezoelectric material such as a piezoelectric ceramic material, as is well known in the art.

As noted above, some of the transducer elements 60 may be configured to transmit and receive sonar pulses (e.g., transmit/receive transducer elements). While the transducer elements 60 may be described herein as transmit/receive transducer elements, in some embodiments, the transducer elements 60 may be configured as receive-only transducer elements, or in other cases, transmit-only transducer elements.

In transducer elements that transmit, during transmission of sonar pulses, the piezoelectric material, being disposed in a rectangular arrangement, provides for an approximation of a linear array having beamwidth characteristics that are a function of the length and width of the rectangular face of the transducer elements and the frequency of operation. In an example embodiment, a transducer element 60 may be configured to operate in accordance with at least two operating frequencies. In this regard, for example, a frequency selection capability may be provided by the sonar module 44 to enable the user to select one of at least two frequencies of operation. In one example, one operating frequency may be set to about 800 kHz and another operating frequency may be set to about 455 kHz. Furthermore, the length of the transducer elements may be set to about 204 mm (or approximately 8 inches) while the width is set to about 3 mm to thereby produce beam characteristics corresponding to a fan of about 0.8 degrees by about 32 degrees at 800 kHz or about 1.4 degrees by about 56 degrees at 455 kHz. For example, when operating at 455 kHz, the length and width of the transducer elements 60 may be such that the beamwidth of sonar beam produced by the transducer elements 60 in a direction parallel to a longitudinal length (L) of the transducer elements 60 is less than about five percent as large as the beamwidth of the sonar beam in a direction (w) perpendicular to the longitudinal length of the transducer elements 60. As such, in some embodiments, any length and width for a transducer element may be used. Lengths longer than 8 inches may be appropriate at operating frequencies lower than those indicated above, and lengths shorter than 8 inches may be appropriate at frequencies higher than those indicated above.

It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

Although dual frequency operations providing a specific beam fan for each respective element for given lengths are described above, it should be understood that other operating ranges could alternatively be provided with corresponding different transducer element sizes and corresponding different beamwidth characteristics. Moreover, in some cases, the sonar module 44 may include a variable frequency selector, to enable an operator to select a particular frequency of choice for the current operating conditions. However, in all cases where the longitudinal length of the transducer elements 60 is generally parallel with the centerline of the vessel, the rectangular shape of the transducer elements 60 provides for a narrow beamwidth in a direction substantially parallel to the centerline of the vessel and wide beamwidth in a direction substantially perpendicular to the centerline of the vessel. However, if the transducer assembly 36 is mounted in a different fashion or to a rotatable accessory on the vessel (e.g., a trolling motor mount), the fan-shaped beams produced will have the wide beamwidth in a direction substantially perpendicular to the longitudinal length of the transducer elements 60 and a narrow beamwidth in a direction substantially parallel to the longitudinal length of the transducer elements 60. Thus, the sonar could also be oriented to provide fore and aft oriented fan-shaped beams or any other orientation relative to the vessel in instances where motion of the vessel is not necessarily in a direction aligned with the centerline of the vessel.

As noted above, the transducer elements 60 may be oriented inside the housing 50 to cover different areas underneath the vessel. For example, with reference to FIGS. 3, 4A, and 4B, the transducer elements 60 may be oriented such that one transducer element faces downwardly, such that it forms a downscan transducer element, and the other two transducer elements may face outwardly and downwardly, such that they each form sidescan transducer elements. A linear downscan transducer element is one that faces such that, during transmission, it transmits sonar pulses in the form of a fan-shaped beam in a direction substantially perpendicular to a place corresponding to the surface of the body of water. A linear sidescan transducer element (if configured for transmission of sonar pulses) is one that faces such that, during transmission, it transmits sonar pulses in the form of a fan-shaped beam at the angle at which the sidescan element is facing (e.g., 30 degrees down from horizontal).

Figure 4A:
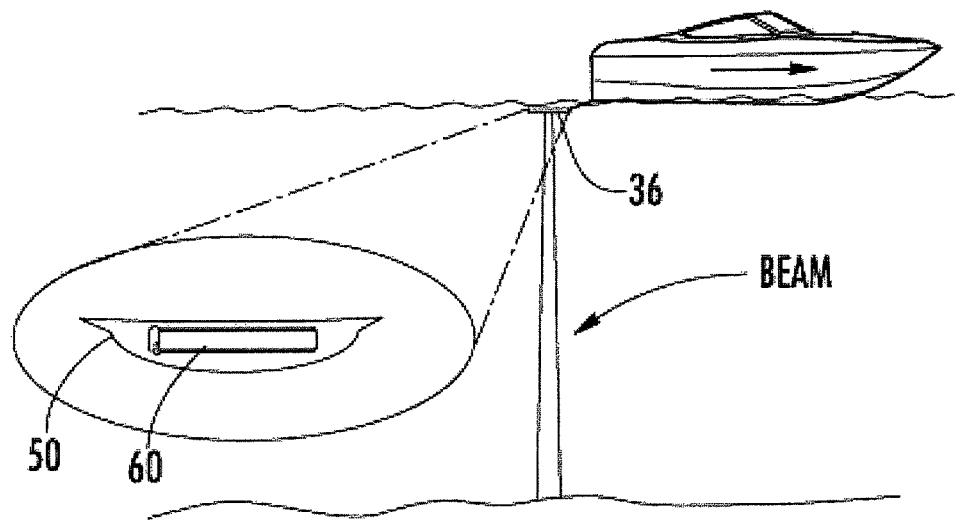
FIG. 4A illustrates a side view showing a beam pattern produced by the transducer assembly shown in FIG. 3, in accordance with example embodiments described herein.
Figure 4B:
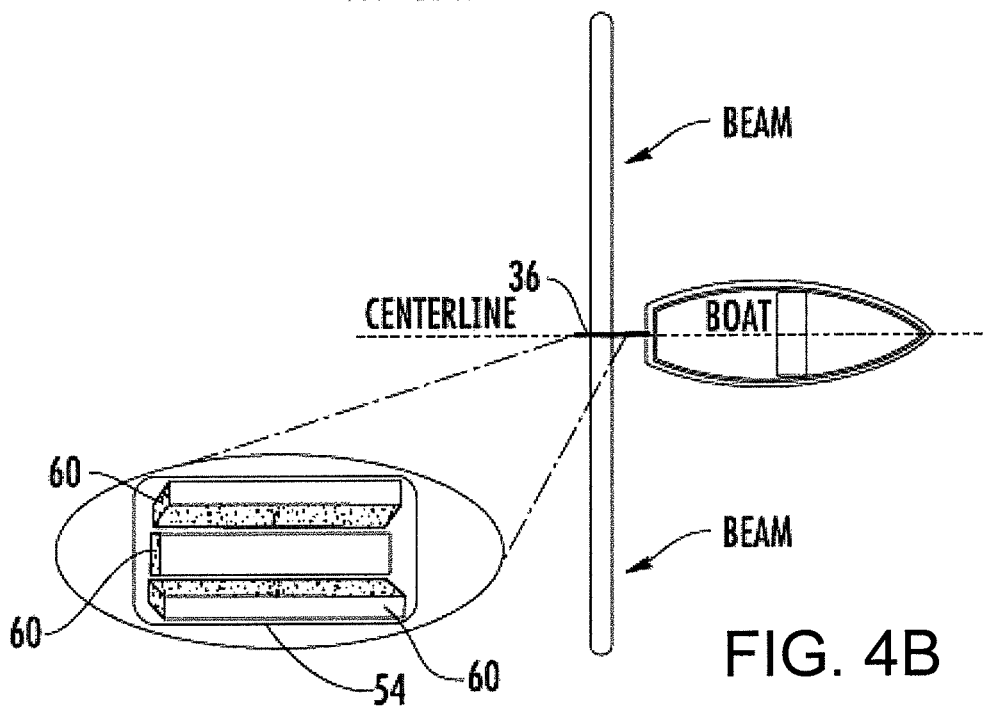
FIG. 4B illustrates a top view showing a beam pattern produced by the transducer assembly shown in FIG. 3, in accordance with example embodiments described herein.

FIGS. 4A and 4B show side and top views, respectively, illustrating the beam characteristics produced by an example embodiment of the present invention. In this regard, FIG. 4A illustrates a side view showing the transducer assembly 36 mounted to a bracket that extends from the aft end of the centerline of the vessel (e.g., boat). As shown in FIG. 4A, the beam produced by the transducer assembly 36 is relatively narrow in the direction substantially parallel to the centerline of the vessel if the transducer elements are aligned for a generally coplanar beam. FIG. 4A also includes a cutaway view of the transducer assembly 36 to show the orientation of the transducer elements 60 in context relative to the vessel according to this example.

Meanwhile, FIG. 4B shows a top view of the beam produced by the transducer assembly 36 if the transducer elements are aligned with their respective beams generally coplanar. As shown in FIG. 4B, the beams produced by the transducer assembly are relatively narrow in the fore-to-aft direction and relatively wide in the direction substantially perpendicular to the centerline of the vessel, extending out to both sides and also covering the water column beneath the vessel, as described below. FIG. 4B also includes a cutaway view of the transducer assembly 36 to show the orientation of the transducer elements 60 in context relative to the vessel according to this example.

FIG. 5 illustrates one example transducer assembly 96 of an arrangement of linear transducer elements 60 within a containment volume 54. In such embodiments described with respect to FIG. 5, each of the transducer elements are configured as transmit/receive transducer elements. The transducer elements 60 may include a port side element 62' positioned to scan substantially to the port side of the vessel, a starboard side element 64' positioned to scan substantially to the starboard side of the vessel, and a downscan element 66' positioned to scan substantially below the vessel.

As shown in FIG. 5, in an example embodiment, both the port side element 62' and the starboard side element 64' may be oriented to face slightly below a surface of the water on which the vessel travels. In one example, both the port side element 62' and the starboard side element 64' may be oriented such that the widest dimension of the beamwidth of each respective element is centered at 30 degrees below a plane substantially parallel to the surface of the water. This angle typically varies from 20 degrees to 40 degrees, but may also be at different angles. Meanwhile, the downscan linear element 66' may be positioned such that the widest dimension of the beamwidth of the downscan element 66' is centered at 90 degrees below the plane substantially parallel to the surface of the water. In other words, the downscan element 66' has the central portion of its fan shape aimed straight down.

The containment volume 54 may include electrical connections (e.g., to a printed circuit board 63) to communicate with the transceiver 34, and may include supports, struts, rods or other supporting structures to secure each of the linear transducer elements 60 in their respective orientations. The transducer elements 60 may be held in place or otherwise affixed to the supporting structures via adhesive or any other suitable joining material and the angles at which the transducer elements 60 are affixed relative to each other and to the housing 50 may vary as necessary or as desired. Additionally, in some embodiments, the containment volume 54 may also contain the transceiver 34 and/or processor 32. In some embodiments, the printed circuit board 63 may include transmitter circuitry 71 and/or receiver circuitry 72.

Figure 6A:
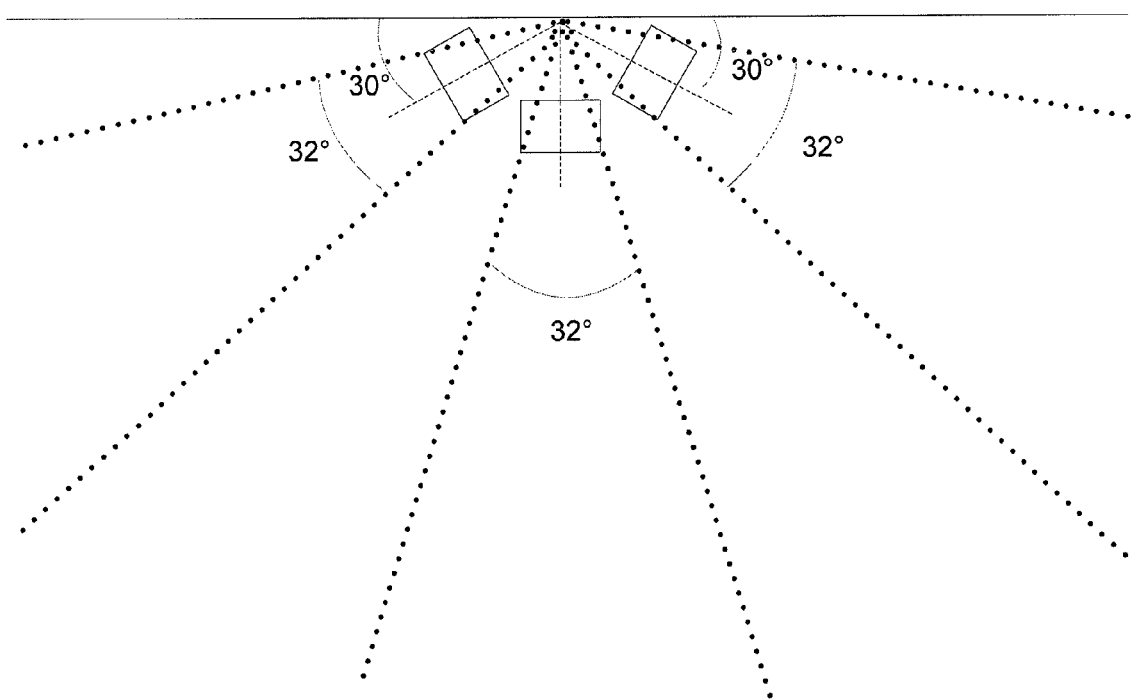
FIG. 6A shows an example of beam coverage for primary energy levels of an 800 kHz operating frequency of the transducer assembly shown in FIG. 5, in accordance with example embodiments described herein.
Figure 6B:
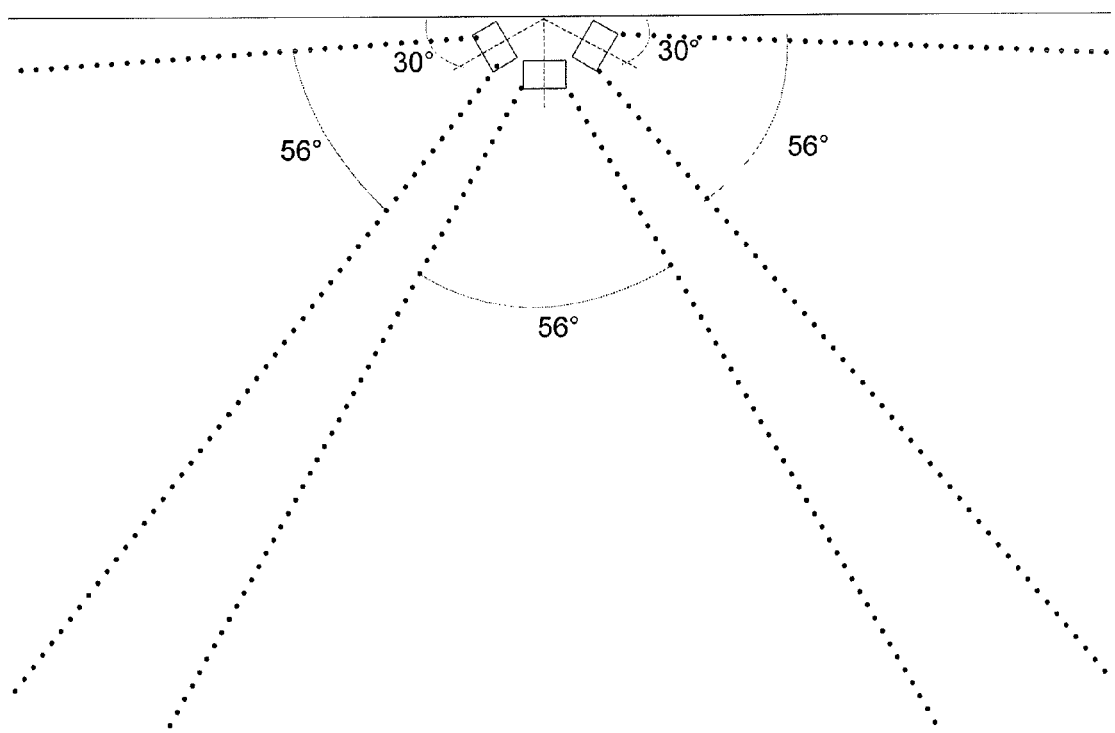
FIG. 6B shows an example of beam coverage for primary energy levels of a 455 kHz operating frequency of the transducer assembly shown in FIG. 5, in accordance with example embodiments described herein.

FIG. 6A shows an example of beam coverage for an 800 kHz operating frequency in one example embodiment. As such, the beamwidth (e.g., width between the half power points) of each of the three linear transducer elements 60 is about 32 degrees. FIG. 6B shows an example of beam coverage for a 455 kHz operating frequency in one example embodiment, thereby providing about 56 degrees of beamwidth for each of the three linear transducer elements 60. Accordingly, at least conceptually, in each of the example embodiments of FIGS. 6A and 6B, the three fan-shaped segments together suggest a discontinuous set of three separate fan shaped beam. However, as noted above, in actuality the fan-shaped beams of the sidescan transducer elements and the fan-shaped beam of the downscan transducer element overlap and are not be confined within a strictly defined 32 degree arc (as shown in FIG. 6A) or a 52 degree arc (as shown in FIG. 6B). In fact, such sonar pulses that form the fan-shaped beam actually overlap with each other, thereby creating interference between the sonar pulses. This interference may result in inconsistencies within the sonar returns, which may result in imperfections in the display of the sonar image.

Figure 7A:
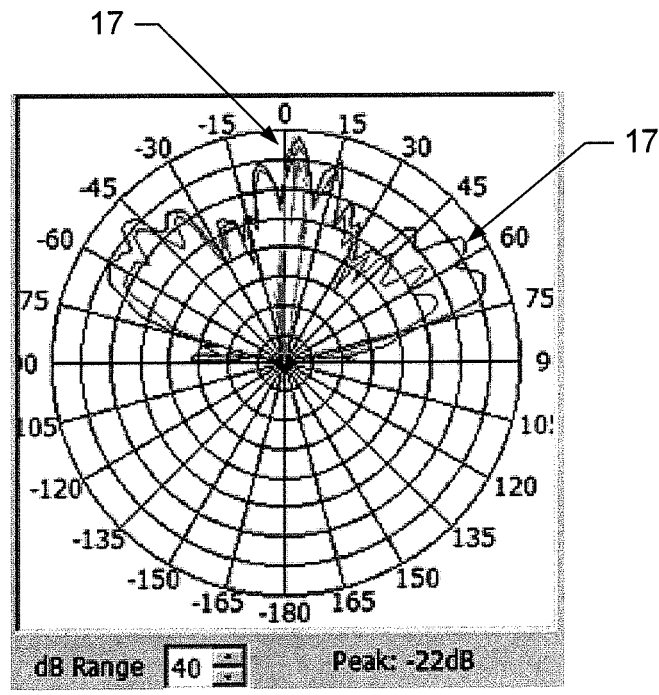
FIG. 7A illustrates an example beam pattern polar coordinate graph for an 800 kHz operating frequency of the transducer assembly shown in FIG. 5, in accordance with example embodiments described herein.
Figure 7B:
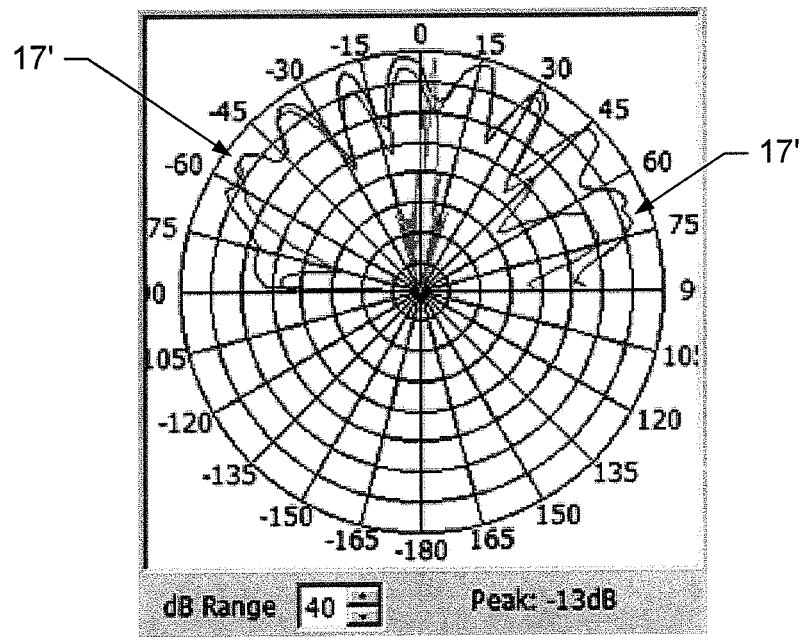
FIG. 7B illustrates an example beam pattern polar coordinate graph for a 455 kHz operating frequency of the transducer assembly shown in FIG. 5, in accordance with example embodiments described herein.

FIGS. 7A and 7B illustrate signs of interference in the beam pattern created by transmission of sonar pulses from embodiments in which both sidescan transducer elements and the downscan transducer element are configured to simultaneously transmit sonar pulses (e.g., shown in FIGS. 5, 6A, and 6B). For example, FIG. 7A illustrates an example beam pattern for an 800 kHz operating frequency of the transducer assembly shown in FIG. 5. The beam pattern illustrates peak performance relative to the orientation of the downscan transducer element (e.g., approximately 0 degrees) and the sidescan transducer elements (e.g., approximately −60 degrees and approximately 60 degrees). However, the beam pattern also illustrates interference in the form of "ripples" (e.g., ripple 17). Such ripples illustrate the adding together of and canceling out of sound waves from the overlapping of sound waves from the sonar pulses of different transducer elements. Likewise, FIG. 7B illustrates an example beam pattern for a 455 kHz operating frequency of the transducer assembly shown in FIG. 5. Similar to the beam pattern of the 800 kHz operating frequency, the beam pattern of the 455 kHz operating frequency also includes peak performance relative to the orientation of the downscan transducer element (e.g., approximately 0 degrees) and the sidescan transducer elements (e.g., approximately −60 degrees and approximately 60 degrees). Moreover, the beam pattern shown in FIG. 7B also illustrates interference in the form of "ripples" (e.g., ripple 17').

Some embodiments of the present invention seek to provide a transducer assembly that reduces the interference produced by sonar pulses transmitted from a downscan transducer element and one or more sidescan transducer elements (e.g., the embodiment described with respect to FIG. 5). Reduction in such interference may provide better sonar returns, which may equate to better quality sonar image data for a better quality sonar image for display to a user.

In some embodiments, a transducer assembly may include a single transmit/receive transducer element and one or more receive-only transducer elements. In such an embodiment, the sonar pulses transmitted by the transmit/receive transducer element may not overlap with other sonar pulses from other transducer elements, which may equate to reduced interference, resulting in better sonar image quality from sonar returns. Moreover, in some embodiments, the transmit/receive transducer element may be configured to transmit sonar pulses in similar directions and ranges (thereby covering substantially the same area) as transducer assemblies that employ multiple transmit/receive transducer elements (e.g., shown in FIG. 5).

Figure 8:
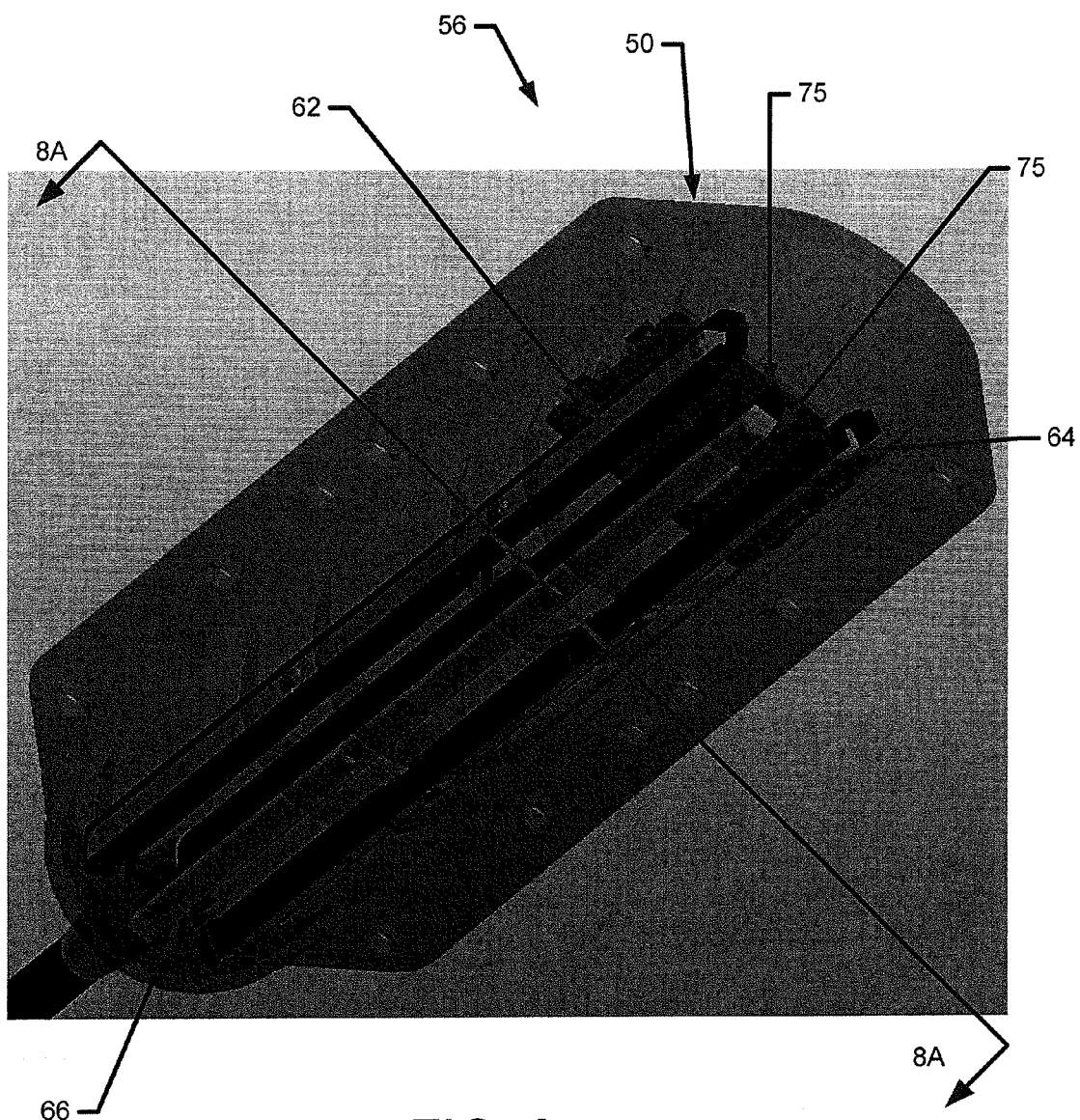
FIG. 8 is a transparent perspective view of components in a containment volume of a housing for an exemplary transducer assembly, in accordance with example embodiments described herein.

FIG. 8 illustrates an exemplary embodiment of a transducer assembly 56 for reduced interference. The transducer assembly 56 may comprise a first transducer element 66, a second transducer element 62, and a third transducer element 64. Similar to the embodiments of the transducer assembly 96 described with respect to FIG. 5, the first transducer element 66 may be positioned within a housing 50 (e.g., the housing described herein with respect to FIG. 3) such that it is aimed downwardly (i.e., a downscan transducer element) and the second and third transducer elements 62, 64 may be positioned within the housing 50 such that they are aimed outwardly and downwardly (i.e., sidescan transducer elements). As noted herein, while the second and third transducer elements 62, 64 are depicted at an angle of 30 degrees down from horizontal, other angles may be used for orientation of the transducer elements.

Unlike the transducer assembly 96 described with respect to FIG. 5, the transducer assembly 56 shown in FIG. 8 comprises first, second, and third transducer elements 66, 62, 64 that vary in configuration, such that at least one transducer element is configured as a transmit/receive transducer element and at least one transducer element is configured as a receive-only transducer element. In the depicted embodiment of FIG. 8, the first transducer element 66 is configured as a transmit/receive transducer element and the second and third transducer elements 62, 64 are configured as receive-only transducer elements.

The first transducer element 66 may be configured to transmit sonar pulses in at least one direction substantially perpendicular to a plane corresponding to the surface of the body of water (e.g., project sonar pulses as a downscan transducer element). As noted above with respect to FIG. 2A, in some embodiments, the first transducer element 66 may be in communication with transmitter circuitry, and the transmitter circuitry may be configured to transfer a transmit signal (e.g., from a transceiver/processor) to the first transducer element 66 to cause the first transducer element 66 to transmit the sonar pulses. Additionally, the first transducer element 66 may be further configured to receive sonar returns from the sonar pulses and convert the sound energy of the sonar returns into downscan sonar return data in the form of electrical signals representative of the sound energy. As noted above with respect to FIG. 2A, in some embodiments, the first transducer element 66 may be in communication with receiver circuitry, and the receiver circuitry may be configured to transfer the sonar return data from the first transducer element 66 (e.g., to a transceiver/processor) for processing and generation of sonar image data for display to a user.

The second and third transducer elements 62, 64 may be configured to receive sonar returns from the sonar pulses (e.g., from the first transducer element 66) and convert sound energy of the sonar returns into sidescan sonar return data in the form of electrical signals representative of the sound energy. As noted above with respect to FIG. 2A, in some embodiments, the second and third transducer elements 62, 64 may each be in communication with receiver circuitry, and the receiver circuitry may be configured to transfer the sonar return data from each of the second and third transducer elements 62, 64 (e.g., to a transceiver/processor) for processing and generation of sonar image data for display to a user.

Figure 12:
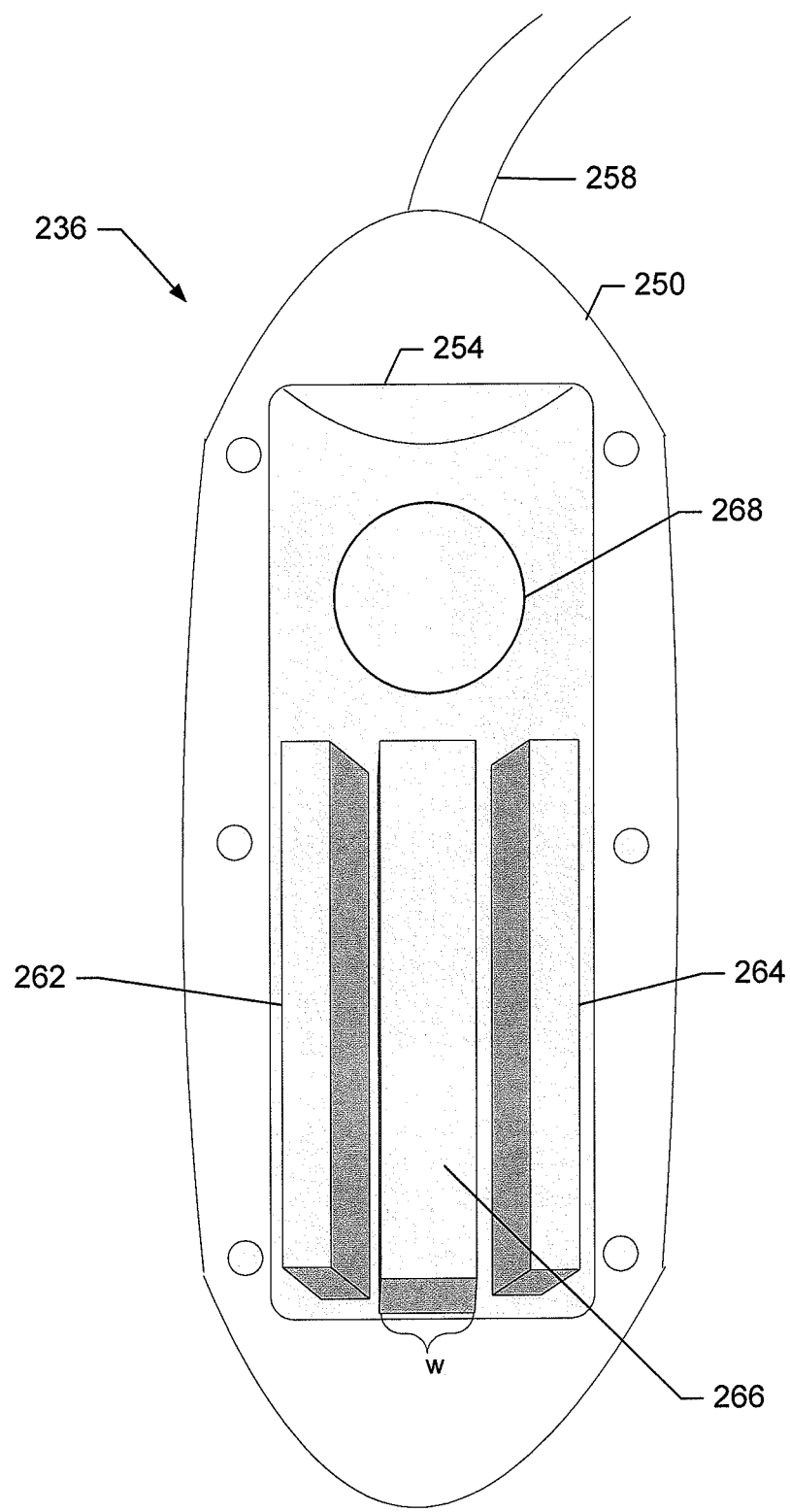
FIG. 12 is a diagram illustrating a more detailed view of another example transducer assembly, in accordance with example embodiments described herein.

As noted above, embodiments of the present invention conceive of transducer assemblies being configured with any combination of orientation of transmit/receive elements and receive-only transducer elements. For example, in some embodiments, a transducer assembly may comprise a linear downscan transmit/receive transducer element and at least one sidescan receive-only transducer element. Likewise, with reference to FIG. 12, in another example embodiment, a housing 250 with a containment volume 254 may include a transducer assembly 236. The transducer assembly 236 may comprise three linear transducer elements 266, 262, 264 and a circular transducer element 268. In such an embodiment, the first linear transducer element 266 and the circular transducer element 268 may be configured as transmit/receive transducer elements and the second and third linear transducer element may be configured as receive-only transducer elements.

In some embodiments, the circular transducer element 268 and the first linear transducer element 266 may be configured to transmit sonar pulses at different frequencies so as to minimize potential overlap (and, thus, interference) between the sonar pulses. Additionally or alternatively, the circular transducer element 268 and the first linear transducer element 266 may be configured for alternate timing of transmission of sonar pulses so as to minimize potential overlap (and, thus, interference) between the sonar pulses.

Thus, as noted above, the circular transducer element 268 may be configured to transmit sonar pulses in a wider area, which is different than the first linear transducer element 266, which is configured to transmit sonar pulses in a fan-shaped beam. Likewise, the linear transducer elements 266, 262, 264 may be configured to receive (e.g., listen for) sonar pulses in fan-shaped beam area. Thus, some of the sonar pulse emitted by the circular transducer 236 may be outside the listening range of the linear transducer elements 266, 262, 264. However, as noted above, the circular transducer element 236 may be configured as a transmit/receive transducer element and, thus, be configured to receive sonar pulses from an area equivalent to the transmission area. Thus, as is consistent with the disclosure herein, some embodiments of the present invention may define a transducer assembly with transducer elements configured to listen to particular areas (e.g., fan-shaped beam areas) for customized sonar returns and sonar images.

As noted above, the shapes and materials used for the transducer elements may vary. In depicted embodiment, the first, second, and third transducer elements 66, 62, 64 each comprise linear transducer elements and may be made of piezoelectric material. Such a transducer element, if it is configured to transmit, transmits sonar pulses in the form of a fan-shaped beam. A linear piezoelectric transducer element is advantageous because of its desirable range and quality for transmission. However, as noted herein, some of the transducer elements may be configured as receive-only transducer elements. Thus, other materials may be more desirable, as they may prove different (if not better) during receipt of sonar returns (e.g., PVDF material provides for shading and beam forming) or, in some cases, may be more cost-effective. As such, embodiments of the present invention enable different materials to be used for each of the transducer elements in one transducer assembly to configure the transducer assembly to be more cost-effective and/or increase performance.

In some embodiments, it may be desirable to obtain wider coverage for the sonar pulses that are transmitted from the transmit/receive transducer element. For example, the transducer assembly 56 comprises only one transducer element (e.g., the first downscan transducer element 66) that is configured to transmit sonar pulses. However, this means that the other two transducer elements (e.g., the second and third sidescan transducer elements 62, 64) are not transmitting sonar pulses (contrary to the embodiment of the transducer assembly 96 described with respect to FIGS. 5, 6A, and 6B). Thus, sonar pulses are not being projected directly in those directions (e.g., 30 degrees down from horizontal on port and starboard of the vessel). To account for this loss of coverage, in some embodiments, the single transmit/receive transducer element may be configured to transmit sonar pulses in a wider area.

Typically transducer elements are partially surrounded by sound-attenuating material that focuses the energy (and, thus, the sonar pulses) of the transducer element. This sound-attenuating material (e.g., foam padding) is configured to substantially attenuate transmission of sonar pulses therethrough. This results in the sonar pulses being transmitted primarily from the transducer element surface(s) that is(are) not covered by the sound-attenuating material. Additionally, this results in the sonar returns being received primarily by only the surface that is not covered. For example, with reference to FIG. 8A, a linear transducer element (e.g., the second transducer element 62) defines a top surface 62a, a bottom surface 62d, and two opposing side surfaces 62b, 62c. The sound-attenuating material 75 (e.g., foam padding) may be positioned proximate the top surface 62a and opposing side surfaces 62b, 62c, with the bottom surface 62d remaining uncovered. Thus, the second transducer element 62 may be configured to receive sonar returns primarily through only the bottom surface 62d. Additionally, if the second transducer element 62 were configured to transmit sonar pulses (e.g., the second transducer element 62' shown in FIG. 5), the sonar pulses would be transmitted outwardly (e.g., into the water) from only the bottom surface 62d. Additionally, the third transducer element 64 may be similarly partially surrounded by a sound-attenuating material.

Figure 8A:
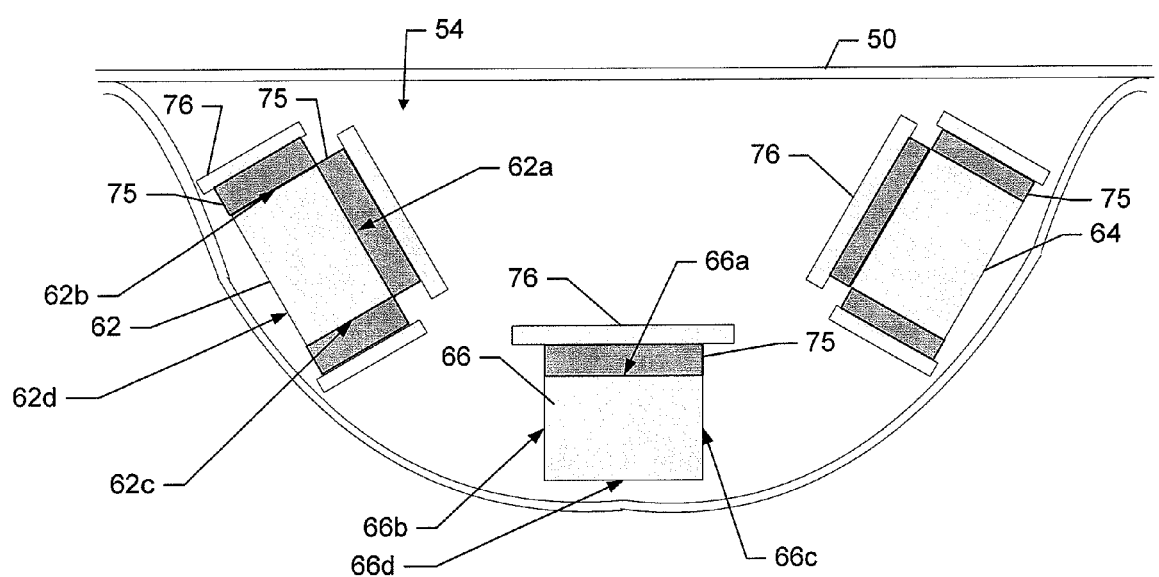
FIG. 8A is a cross-sectional view of the transducer assembly shown in FIG. 8 taken along Line 8A in FIG. 8, in accordance with example embodiments described herein.

In some embodiments, a shield may be positioned proximate the sound-attenuating material to hold the sound-attenuating material in place and to further substantially attenuate transmission of sonar pulses and receipt of sonar returns therethrough. As shown in FIG. 8A, the shield 76 may be positioned adjacent the sound-attenuating material 75 proximate the top surface 62a and opposing side surfaces 62b, 62c of the second transducer element 62. Additionally, the third transducer element 64 may be similarly partially surrounded by a shield 76.

To create a wider coverage area for transmission of sonar pulses of the transmit/receive transducer element, in some embodiments, the sound-attenuating material and/or shield may be removed from portions of the transmit/receive transducer element. In particular, any surface of the transmit/receive transducer element that is not covered by the sound-attenuating material and/or shield may now transmit sonar pulses, thereby increasing the coverage area of the sonar pulses transmitted from the transmit/receive transducer element.

FIG. 8A shows the first transducer element 66 (which is configured as a transmit/receive transducer element) with sound-attenuating material 75 and a shield 76 only covering the top surface 66a. As such, the bottom surface 66d and opposing side surfaces 66b, 66c are free from the sound-attenuating material 75 and shield 76.

Figure 8B:
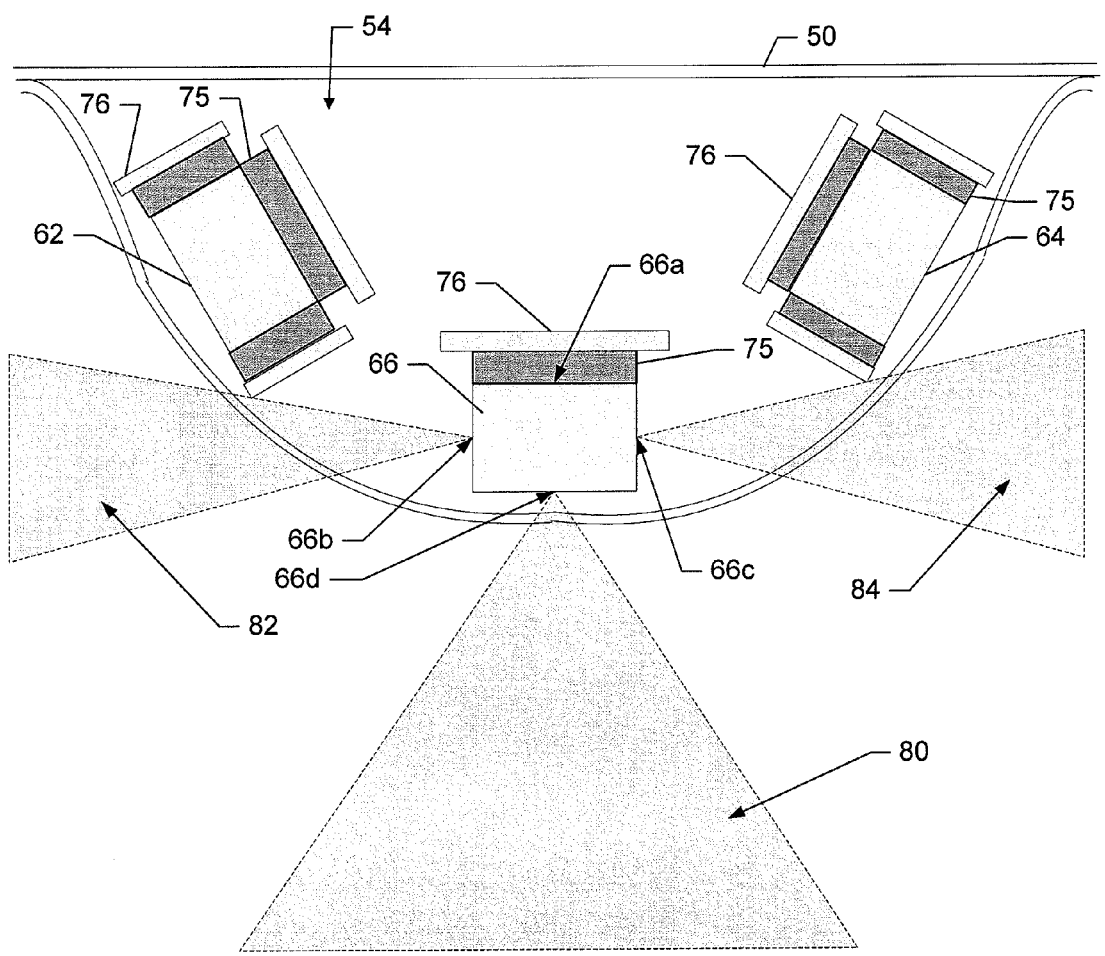
FIG. 8B is a cross-sectional view of the transducer assembly shown in FIG. 8 taken along Line 8A in FIG. 8, wherein example beam coverage is illustrated, in accordance with example embodiments described herein.
Figure 8C:
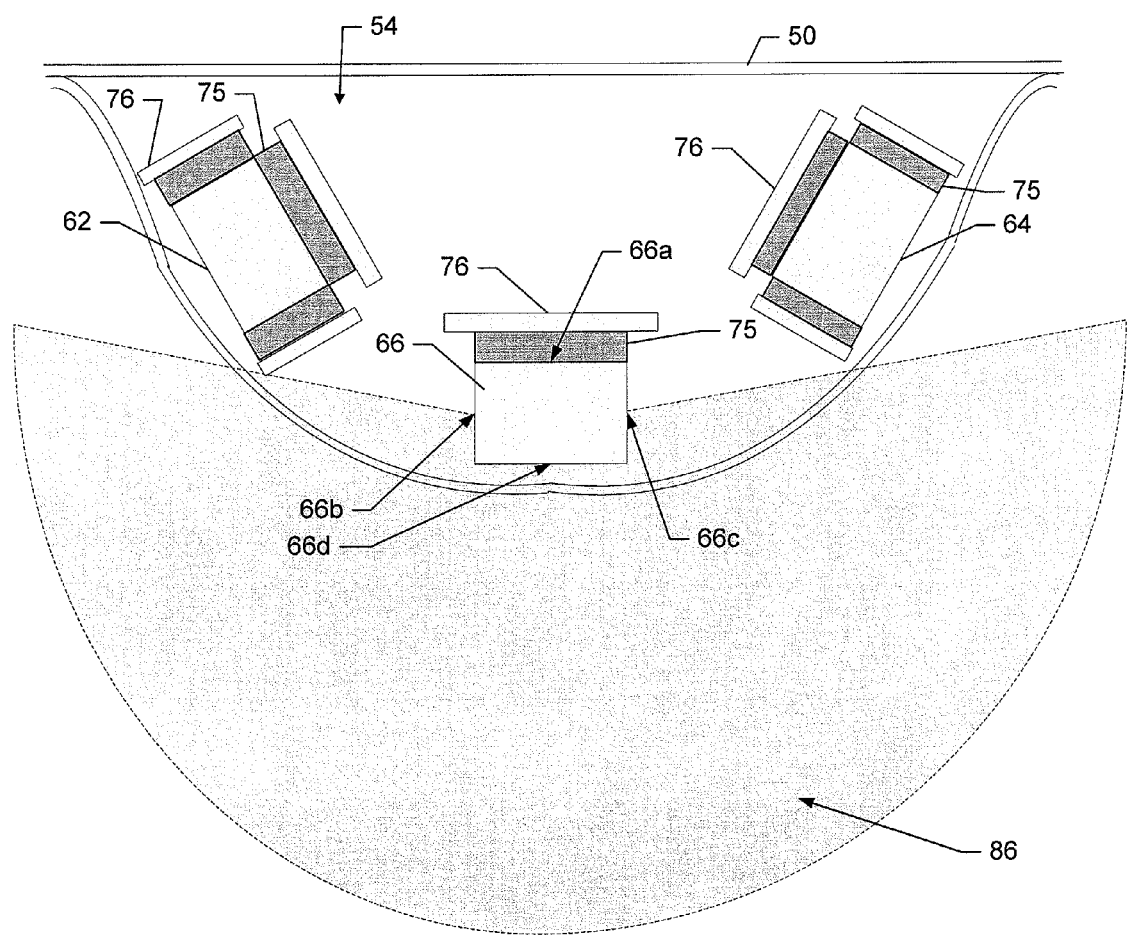
FIG. 8C is another cross-sectional view of the transducer assembly shown in FIG. 8 taken along Line 8A in FIG. 8, wherein example beam coverage is illustrated, in accordance with example embodiments described herein.

FIG. 8B shows a conceptual schematic of an example beam coverage of the example transducer assembly of FIG. 8. In particular, FIG. 8B illustrates the beneficial gain in beam coverage from removal of the sound-attenuating material 75 and shield 76 from the first transducer element 66. In the depicted embodiment, the first transducer element 66 is now configured to transmit sonar pulses in the form of a fan-shaped beam from the bottom surface 66d and the opposing side surfaces 66b, 66c without transmitting sonar pulses from the top surface 66a. Thus, the first transducer element 66 is configured to emit a fan-shaped beam of sonar pulses in a direction substantially perpendicular to the surface of the water (e.g., beam 80), as well as in opposite directions that are substantially parallel to the surface of the water (e.g., beams 82, 84). This provides a wider coverage of sonar pulses and, in fact, provides a similar coverage of sonar pulses as the transducer assembly 96 of FIG. 5. Along these same lines, the beams 80, 82, 84 shown in FIG. 8B are conceptual in nature. Therefore, while gaps are shown in between each of the beams 80, 82, 84, in some embodiments, the first transducer element 66 may not include gaps when transmitting sonar pulses and, thus, full coverage below and to the sides of the first transducer element 66 is obtained (shown as beam 86 in FIG. 8C). For example, the beams 80, 82, 84 may provide substantially continuous sonar coverage from one side of a vessel on which the housing is mounted to an opposite side of the vessel (e.g., beam 86 shown in FIG. 8C). As shown and described herein, FIGS. 8A, 8B, and 8C are conceptual in nature and, thus, the size and shape of the sound-attenuating material and/or shield is not meant to limit embodiments of the present invention and is used for explanatory purposes.

Figure 9A:
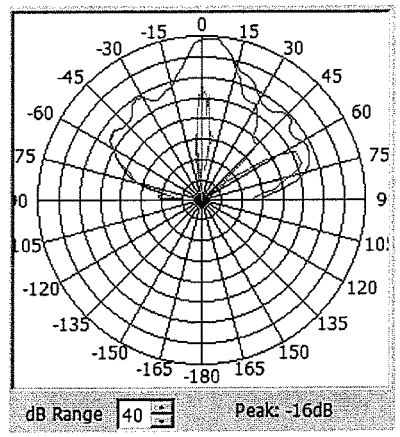
FIG. 9A illustrates an example beam pattern for primary energy levels of an 800 kHz operating frequency of the transducer assembly shown in FIG. 8, in accordance with example embodiments described herein.
Figure 9B:
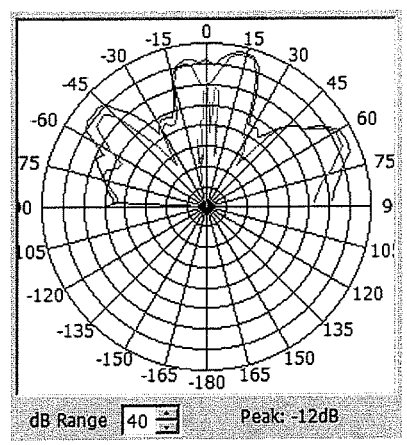
FIG. 9B illustrates an example beam pattern for primary energy levels of a 455 kHz operating frequency of the transducer assembly shown in FIG. 8, in accordance with example embodiments described herein.

FIGS. 9A and 9B illustrate beam patterns created by transmission of sonar pulses from embodiments in which the downscan transducer element (with bottom and opposing side surface free from sound-attenuating material and shield) is configured to transmit sonar pulses without the sidescan transducer elements transmitting sonar pulses (e.g., transducer assembly 56). FIG. 9A illustrates an example beam pattern for an 800 kHz operating frequency of the transducer assembly 56 shown in FIG. 8. The beam pattern illustrates peak performance at approximately 0 degrees and sustained performances only slightly attenuated from 30 degrees to 60 degrees and from −30 degrees to −60 degrees. Similarly, FIG. 9B illustrates an example beam pattern for a 455 kHz operating frequency of the transducer assembly 56 shown in FIG. 8. The beam pattern illustrates peak performance at approximately 0 degrees and slightly smaller peak performances at approximately −60 degrees and approximately 60 degrees. This beam pattern, when compared to the beam pattern shown in FIGS. 7A and 7B, provides further evidence that a similar (and wide) beam coverage area is produced. In fact, these beam pattern plots illustrate that little coverage is lost by transmitting sonar pulses from the bottom surface and opposing side surface of the downscan transducer element (FIG. 8) instead of transmitting sonar pulses from both the downscan transducer element and the two sidescan transducer elements (FIG. 5).

Additionally, the beam patterns illustrated by FIGS. 9A and 9B also show a significant reduction in interference (as illustrated by fewer "ripples") when compared to the beam patterns shown in FIGS. 7A and 7B. In particular, the beam patterns of FIGS. 9A and 9B appear smoother than the beam patterns of FIGS. 7A and 7B. This illustrates that the overlapping beam problems of the transducer assembly 96 of FIG. 5 are substantially alleviated with the transducer assembly 56 of FIG. 8.

Figure 10A:
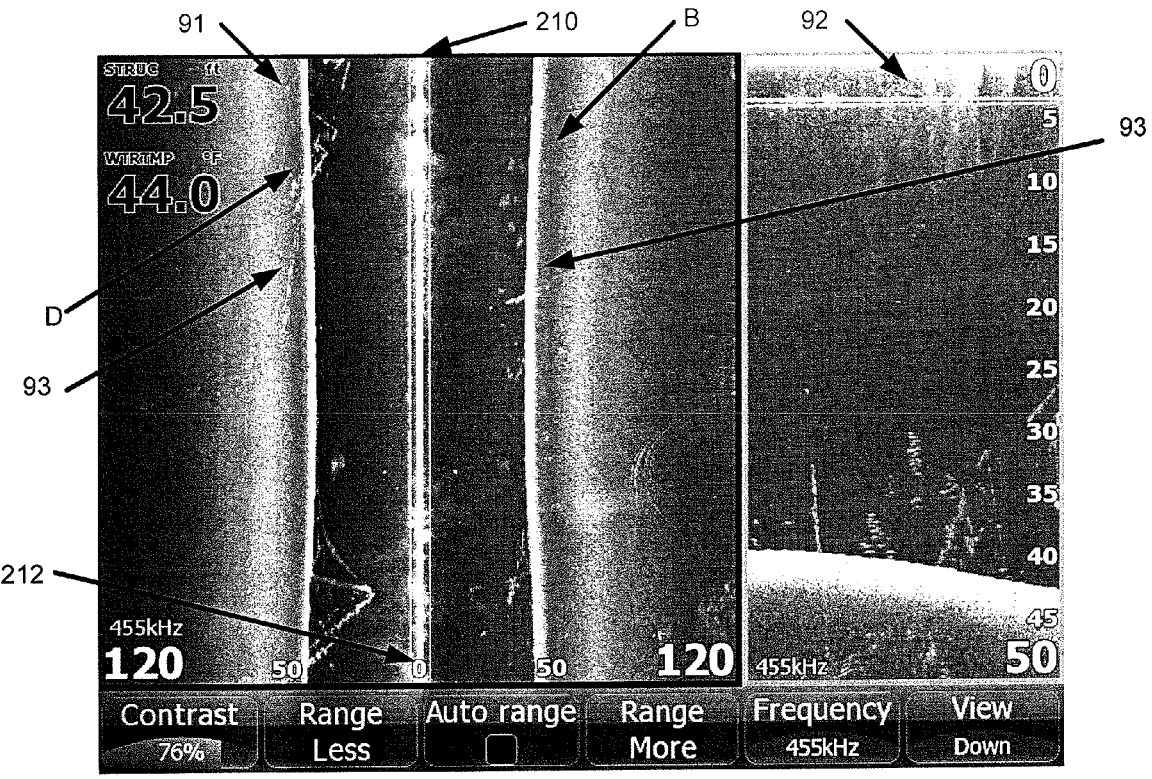
FIG. 10A illustrates example sonar images that may be produced based on data from the transducer assembly shown in FIG. 8, in accordance with example embodiments described herein.
Figure 10B:
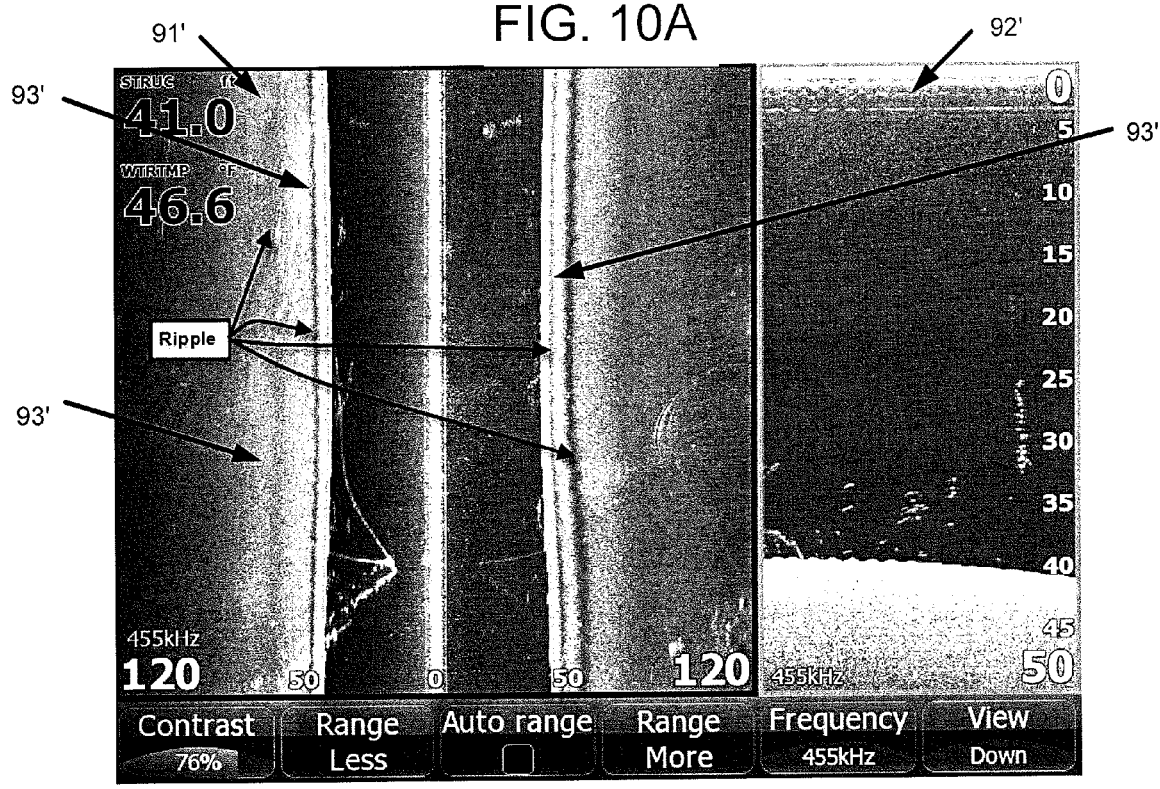
FIG. 10B illustrates example sonar images that may be produced based on data from the transducer assembly shown in FIG. 5, in accordance with example embodiments described herein.

FIGS. 10A and 10B illustrate further evidence of reduced interference in sonar images created from transducer assembly 56 of FIG. 8 (shown if FIG. 10A) as opposed to the transducer assembly 96 of FIG. 5 (shown in FIG. 10B).

FIG. 10A shows a sonar image, which may be displayed to a user, of sonar returns from the transducer assembly 56 of FIGS. 8, 8A, and 8B. The sonar image is divided into two portions. The first portion 91 (on the left) illustrates a conceptual sidescan sonar image of both sides of the bottom of the sea floor from the boat, as if the boat were traveling along the line corresponding to 0 feet in depth. The bottom of the sea floor is indicated to be present at around a little less than 50 feet below the boat. This is illustrated by the relatively solid white line that runs from top of the window to the bottom of the window around 50 feet. Areas near the bottom of the sea floor (e.g., around areas 93) appear consistent and smooth in FIG. 10A. The second portion 92 illustrates a downscan sonar view from the bottom of the boat, as if the boat was at the top of the window. Thus, the bottom of the sea floor appears located around 40 to 45 feet.

FIG. 10B shows a sonar image, which may be displayed to a user, of sonar returns from the transducer assembly 96 of FIG. 5 at the same location. The first portion 92' shows that the bottom of the sea floor is similarly located around a little less than 50 feet below the boat. However, as can be seen with reference to the sidescan sonar image areas 93', areas near the bottom of the sea floor have inconsistencies (e.g., "ripples") which correlate to the "ripples" in the beam pattern shown in FIGS. 7A and 7B and the interference of sonar pulses that are transmitted from each of the downscan and sidescan transducer elements.

FIG. 10A show an example of images that may be produced by embodiments of the present invention. For this example, assume the top of the display (identified by arrow 210) shows the most recent data (e.g., corresponding to the vessel's current position) and the bottom of the display (identified by arrow 212) shows the oldest data. In some embodiments, the first transducer element 66 may be configured to receive sonar returns indicative of depth data, bottom feature data, or water column data for the portion of the sea floor beneath the water craft, e.g., that portion between reference points B and D in FIG. 10A.

Figure 11:
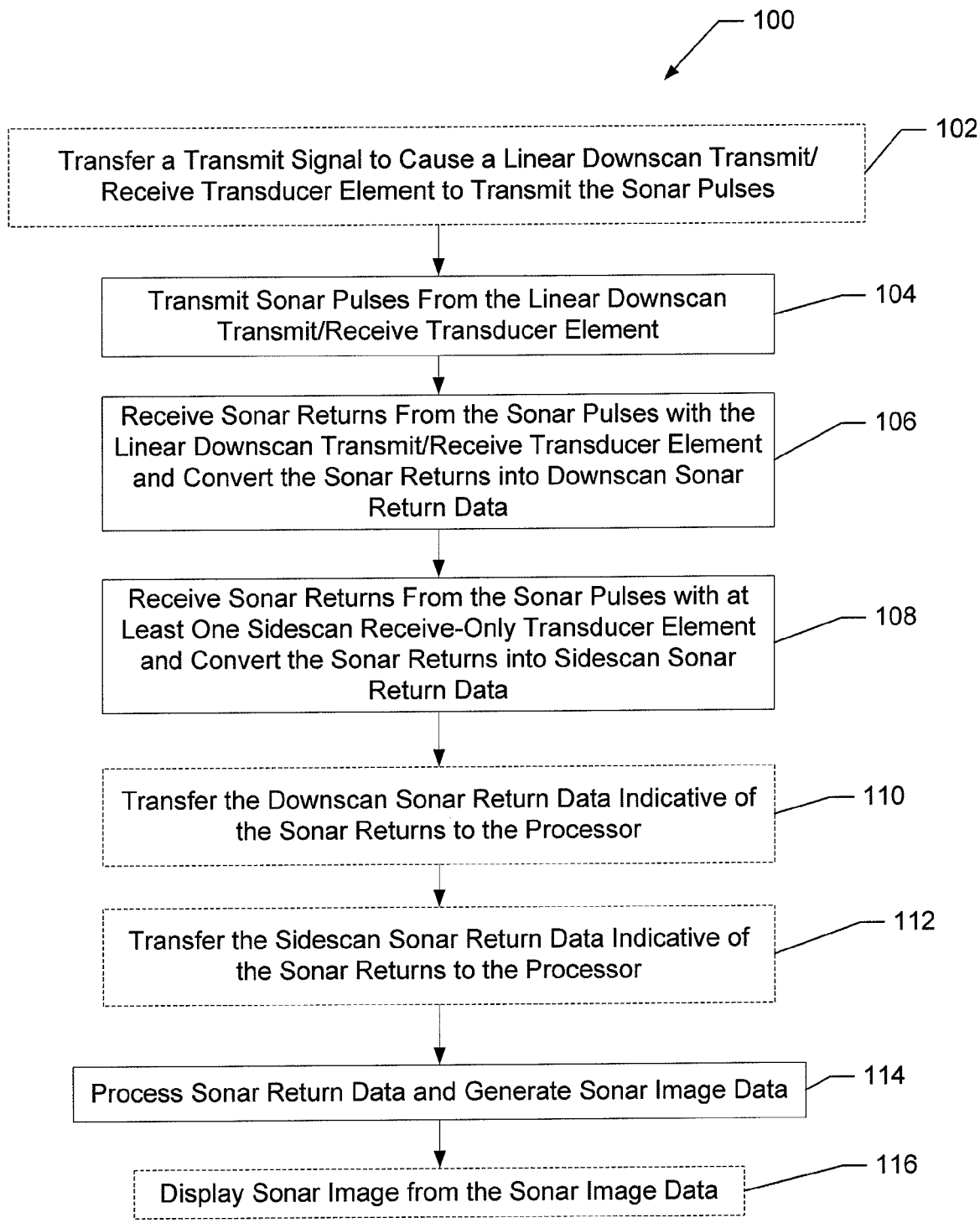
FIG. 11 illustrates an example method of operating an example transducer assembly, in accordance with example embodiments described herein.

FIG. 11 illustrates a flowchart according to an example method for operating a transducer assembly according to an example embodiment 100. Operations that are shown in dashed lines need to necessarily be performed for embodiments of the present invention. Some of the operations illustrated in and described with respect to FIG. 11 may, for example, be performed by, with the assistance of, and/or under the control of one or more of the processor 32 or transceiver 34. Operation 102 may comprise transferring a transmit signal to cause a linear downscan transmit/receive transducer element to transmit the sonar pulses. The processor 32, transceiver 34, or transmitter circuitry 71 may, for example, provide means for performing operation 102. Operation 104 may comprise transmitting sonar pulses from the linear downscan transmit/receive transducer element.

Operation 106 may comprise receiving sonar returns from the sonar pulses with the linear downscan transmit/receive transducer element and converting the sonar returns into downscan sonar return data. Operation 108 may comprise receiving sonar returns from the sonar pulses with at least one sidescan receive-only transducer element and converting the sonar returns into sidescan sonar return data. Operation 110 may comprise transferring the downscan sonar return data indicative of the sonar returns to the processor. The transceiver 34 or receiver circuitry 72 may, for example, provide means for performing operation 110. Operation 112 may comprise transferring the sidescan sonar return data indicative of the sonar returns to the processor. The transceiver 34 or receiver circuitry 72 may, for example, provide means for performing operation 112.

Operation 114 may comprise processing the sonar return data and generating sonar image data. The processor 32 may, for example, provide means for performing operation 114. Operation 116 may comprise displaying a sonar image from the sonar image data. The processor 32, user interface 39, or display 38 may, for example, provide means for performing operation 116.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A transducer assembly comprising:
   a housing mountable to a water craft capable of traversing a surface of a body of water;
   a linear downscan transmit/receive transducer element positioned within the housing and aimed downwardly, and configured to transmit sonar pulses in the form of a fan-shaped beam in at least a direction substantially perpendicular to a plane corresponding to the surface of the body of water, wherein the linear downscan transmit/receive transducer element is further configured to receive sonar returns from the sonar pulses and convert sound energy of the sonar returns into downscan sonar return data in the form of electrical signals representative of the sound energy, wherein the linear downscan transmit/receive transducer element defines a substantially rectangular shape with a top surface, bottom surface, and opposing side surfaces;
   sound-attenuating material configured to substantially attenuate transmission of sonar pulses therethrough, wherein the sound-attenuating material is positioned proximate to the top surface of the linear downscan transmit/receive transducer element, and wherein the opposing side surfaces and bottom surface are substantially free of the sound-attenuating material such that the linear downscan transmit/receive transducer element is configured to transmit sonar pulses from the bottom surface and opposing side surfaces; and
   at least one sidescan receive-only transducer element positioned within the housing and aimed outwardly and downwardly, and configured to receive sonar returns from the sonar pulses transmitted at least from one of the opposing side surfaces of the linear downscan transmit/receive transducer element and convert sound energy of the sonar returns into sidescan sonar return data in the form of electrical signals representative of the sound energy.

2. The transducer assembly according to claim 1 further comprising:
   transmitter circuitry in communication with the linear downscan transmit/receive transducer element, wherein the transmitter circuitry is configured to transfer a transmit signal to the linear downscan transmit/receive transducer element to cause the linear downscan transmit/receive transducer element to transmit the sonar pulses; and
   receiver circuitry in communication with the linear downscan transmit/receive transducer element and the at least one sidescan receive-only transducer element, wherein the receiver circuitry is configured to transfer said sonar return data from the linear downscan transmit/receive transducer element and the at least one sidescan receive-only transducer element for processing and generation of sonar image data for display to a user.

3. The transducer assembly according to claim 1 further comprising a shield configured to substantially attenuate transmission of sonar pulses therethrough, wherein the shield is positioned adjacent to the sound-attenuating material proximate to the top surface of the linear downscan transmit/receive transducer element, the opposing sides and bottom surface being free of the shield.

4. The transducer assembly according to claim 1, wherein the respective sonar pulses produced from each of the bottom surface and opposing side surfaces of the linear downscan transmit/receive transducer element collectively provide substantially continuous sonar coverage from one side of the water craft to an opposite side of the water craft.

5. The transducer assembly according to claim 1, wherein the at least one sidescan receive-only transducer element comprises a different material than the linear downscan transmit/receive transducer element.

6. The transducer assembly according to claim 1, wherein the linear downscan transmit/receive transducer element is configured to operate at a selected one of at least two selectable operating frequencies.

7. The transducer assembly according to claim 6, wherein the selectable operating frequencies include about 455 kHz and about 800 kHz.

8. The transducer assembly according to claim 1, wherein the fan-shaped beam comprises a beamwidth of about 0.8 degrees by about 32 degrees or of about 1.4 degrees by about 56 degrees.

9. The transducer assembly according to claim 1, wherein the at least one sidescan receive-only transducer element comprises a first sidescan receive-only transducer element and a second sidescan receive-only transducer element.

10. The transducer assembly according to claim 9, wherein the first sidescan receive-only transducer element is positioned within the housing so as to be aimed about a 30 degree angle downward from the plane parallel to the surface of the water, and wherein the second sidescan receive-only transducer element is positioned within the housing so as to be aimed about a 30 degree angle downward from the plane parallel to the surface of the water.

11. The transducer assembly according to claim 9, wherein the first sidescan receive-only transducer element faces substantially to the port side of the water craft, and wherein the second sidescan receive-only transducer element faces substantially to the starboard side of the water craft.

12. The transducer assembly according to claim 9, wherein the first and second sidescan receive-only transducer elements are linear transducer elements.

13. The transducer assembly according to claim 12, wherein a length of a rectangular face of each of the linear downscan and first and second linear sidescan transducer elements is about 204 mm and a width of the rectangular face of each of the transducer elements is about 3 mm.

14. The transducer assembly according to claim 9, wherein the linear downscan transmit/receive transducer element and the first and second sidescan receive-only transducer elements are positioned within the housing such that longitudinal lengths of each of the transducer elements are substantially parallel to each other.

15. The transducer assembly according to claim 9, wherein the linear downscan transmit/receive transducer element and the first and second sidescan receive-only transducer elements are positioned side-by-side with respect to each other.

16. The transducer assembly according to claim 9, wherein the linear downscan transmit/receive transducer element is positioned between the first sidescan receive-only transducer element and second sidescan receive-only transducer element.

17. The transducer assembly according to claim 1, wherein each of the linear downscan transmit/receive transducer element and the at least one sidescan receive-only transducer element is configured to communicate with a transceiver.

18. The transducer assembly according to claim 1, wherein a length of a rectangular face of the linear downscan transmit/receive transducer element is about 204 mm and a width of the rectangular face is about 3 mm.

19. The transducer assembly according to claim 1, wherein the fan-shaped beam comprises a beamwidth in a direction parallel to a longitudinal length of the linear downscan transmit/receive transducer element less than about five percent as large as a beamwidth of the fan-shaped beam in a direction perpendicular to the longitudinal length of the linear downscan transmit/receive transducer element.

20. The transducer assembly according to claim 1, wherein the linear downscan transmit/receive transducer element is configured to generate sonar pulses defining a fan-shaped beam extending from one side of the water craft to an opposite side of the water craft.

21. The transducer assembly according to claim 1, wherein the housing has a streamlined shape.

22. The transducer assembly according to claim 1, wherein the linear downscan transmit/receive transducer element generates downscan sonar return data representing depth data.

23. The transducer assembly according to claim 1, wherein the linear downscan transmit/receive transducer element generates downscan sonar return data representing water column data.

24. The transducer assembly according to claim 1, wherein the linear downscan transmit/receive transducer element generates downscan sonar return data representing bottom data.

25. The transducer assembly according to claim 1, wherein the linear downscan transmit/receive transducer element generates downscan sonar return data representing two or more of depth data, water column data, and bottom data.

26. The transducer assembly according to claim 1, wherein the linear downscan transmit/receive transducer element generates downscan sonar return data representing data vertically below the linear downscan transmit/receive transducer element.

27. The transducer assembly according to claim 1, further comprising a circular transmit/receive transducer element positioned within the housing.

28. A sonar system comprising:
a housing mountable to a water craft capable of traversing a surface of a body of water;
a linear downscan transmit/receive transducer element positioned within the housing and aimed downwardly, and configured to transmit sonar pulses in the form of a fan-shaped beam in at least a direction substantially perpendicular to a plane corresponding to the surface of the body of water, wherein the linear downscan transmit/receive transducer element is further configured to receive sonar returns from the sonar pulses and convert sound energy of the sonar returns into downscan sonar return data in the form of electrical signals representative of the sound energy, wherein the linear downscan transmit/receive transducer element defines a substantially rectangular shape with a top surface, bottom surface, and opposing side surfaces;
sound-attenuating material configured to substantially attenuate transmission of sonar pulses therethrough, wherein the sound-attenuating material is positioned proximate to the top surface of the linear downscan transmit/receive transducer element, and wherein the opposing side surfaces and bottom surface are substantially free of the sound-attenuating material such that the linear downscan transmit/receive transducer element is configured to transmit sonar pulses from the bottom surface and opposing side surfaces;

at least one sidescan receive-only transducer element positioned within the housing and aimed outwardly and downwardly, and configured to receive sonar returns from the sonar pulses transmitted at least from one of the opposing side surfaces of the linear downscan transmit/receive transducer element and convert sound energy of the sonar returns into sidescan sonar return data in the form of electrical signals representative of the sound energy; and a processor configured to receive said sonar return data and generate sonar image data for display to a user.

29. The sonar system according to claim 28 further comprising:

transmitter circuitry in communication with the linear downscan transmit/receive transducer element, wherein the transmitter circuitry is configured to transfer a transmit signal to the linear downscan transmit/receive transducer element to cause the linear downscan transmit/receive transducer element to transmit the sonar pulses; and receiver circuitry in communication with the linear downscan transmit/receive transducer element and the at least one sidescan receive-only transducer element, wherein the receiver circuitry is configured to transfer said sonar return data from the linear downscan transmit/receive transducer element and the at least one sidescan receive-only transducer element to the processor.

30. The sonar system according to claim 28 further comprising a shield configured to substantially attenuate transmission of sonar pulses therethrough, wherein the shield is positioned adjacent to the sound-attenuating material proximate to the top surface of the linear downscan transmit/receive transducer element, the opposing sides and bottom surfaces being free of the shield.

31. The sonar system according to claim 28, wherein the respective sonar pulses produced from each of the bottom surface and opposing side surfaces of the linear downscan transmit/receive transducer element collectively provide substantially continuous sonar coverage from one side of the water craft to an opposite side of the water craft.

32. The sonar system according to claim 28, wherein the at least one sidescan receive-only transducer element comprises a different material than the linear downscan transmit/receive transducer element.

33. The sonar system according to claim 28, wherein the linear downscan transmit/receive transducer element is configured to operate at a selected one of at least two selectable operating frequencies.

34. The sonar system according to claim 33, wherein the selectable operating frequencies include about 455 kHz and about 800 kHz.

35. The sonar system according to claim 28, wherein the fan-shaped beam comprises a beamwidth of about 0.8 degrees by about 32 degrees or of about 1.4 degrees by about 56 degrees.

36. The sonar system according to claim 28, wherein the at least one sidescan receive-only transducer element comprises a first sidescan receive-only transducer element and a second sidescan receive-only transducer element.

37. The sonar system according to claim 36, wherein the first sidescan receive-only transducer element is positioned within the housing so as to be aimed about a 30 degree angle downward from the plane parallel to the surface of the water, and wherein the second sidescan receive-only transducer element is positioned within the housing so as to be aimed about a 30 degree angle downward from the plane parallel to the surface of the water.

38. The sonar system according to claim 36, wherein the first sidescan receive-only transducer element faces substantially to the port side of the water craft, and wherein the second sidescan receive-only transducer element faces substantially to the starboard side of the water craft.

39. The sonar system according to claim 36, wherein the first and second sidescan receive-only transducer elements are linear transducer elements.

40. The sonar system according to claim 39, wherein a length of a rectangular face of each of the linear downscan and first and second linear sidescan transducer elements is about 204 mm and a width of the rectangular face of each of the transducer elements is about 3 mm.

41. The sonar system according to claim 36, wherein the linear downscan transmit/receive transducer element and the first and second sidescan receive-only transducer elements are positioned within the housing such that longitudinal lengths of each of the transducer elements are substantially parallel to each other.

42. The sonar system according to claim 36, wherein the linear downscan transmit/receive transducer element and the first and second sidescan receive-only transducer elements are positioned side-by-side with respect to each other.

43. The sonar system according to claim 36, wherein the linear downscan transmit/receive transducer element is positioned between the first sidescan receive-only transducer element and second sidescan receive-only transducer element.

44. The sonar system according to claim 28 further comprising a transceiver, wherein each of the linear downscan transmit/receive transducer element and the at least one sidescan receive-only transducer element is configured to communicate with the transceiver.

45. The sonar system according to claim 28, wherein a length of a rectangular face of the linear downscan transmit/receive transducer element is about 204 mm and a width of the rectangular face is about 3 mm.

46. The sonar system according to claim 28, wherein the fan-shaped beam comprises a beamwidth in a direction parallel to a longitudinal length of the linear downscan transmit/receive transducer element less than about five percent as large as a beamwidth of the fan-shaped beam in a direction perpendicular to the longitudinal length of the linear downscan transmit/receive transducer element.

47. The sonar system according to claim 28, wherein the linear downscan transmit/receive transducer element is configured to generate sonar pulses defining a fan-shaped beam extending from one side of the water craft to an opposite side of the water craft.

48. The sonar system according to claim 28, wherein the housing has a streamlined shape.

49. The sonar system according to claim 28, wherein the linear downscan transmit/receive transducer element generates downscan sonar return data representing depth data.

50. The sonar system according to claim 28, wherein the linear downscan transmit/receive transducer element generates downscan sonar return data representing water column data.

51. The sonar system according to claim 28, wherein the linear downscan transmit/receive transducer element generates downscan sonar return data representing bottom data.

52. The sonar system according to claim 28, wherein the linear downscan transmit/receive transducer element generates downscan sonar return data representing two or more of depth data, water column data, and bottom data.

53. The sonar system according to claim 28, wherein the linear downscan transmit/receive transducer element generates downscan sonar return data representing data vertically below the linear downscan transmit/receive transducer element.

54. The sonar system according to claim 28 further comprising an Ethernet Hub in communication with the processor.

55. The sonar system according to claim 28, wherein the sonar system is provided within the housing.

56. The sonar system according to claim 28 further comprising a display configured to present an image representing the sonar image data.

57. The sonar system according to claim 56, wherein the display is configured to simultaneously present different images representing different information for the sonar image data.

58. The sonar system according to claim 56, wherein the display is user-configurable to define a predefined set of display images that may be presented.

59. The sonar system according to claim 56, wherein the display further displays at least one of time, temperature, GPS information, or waypoint designations.

60. The sonar system according to claim 28, further comprising a circular transmit/receive transducer element positioned within the housing.

61. A method comprising:
transmitting sonar pulses from a linear downscan transmit/receive transducer element positioned within a housing mountable to a water craft capable of traversing a surface of a body of water, wherein each of the sonar pulses is transmitted as a fan-shaped beam in at least a direction substantially perpendicular to a plane corresponding to the surface of the body of water, wherein sound-attenuating material is positioned proximate to the top surface of the linear downscan transmit/receive transducer element, and wherein the opposing side surfaces and bottom surface are substantially free of the sound-attenuating material such that the linear downscan transmit/receive transducer element is configured to transmit sonar pulses from the bottom surface and opposing side surfaces, wherein the sound-attenuating material is configured to substantially attenuate transmission of sonar pulses therethrough;
receiving sonar returns from the sonar pulses with the linear downscan transmit/receive transducer element, the linear downscan transmit/receive transducer element being configured to convert sound energy of the sonar returns into downscan sonar return data in the form of electrical signals representative of the sound energy;
receiving, with at least one sidescan receive-only transducer element, sonar returns from the sonar pulses transmitted at least from one of the opposing side surfaces of the linear downscan transmit/receive transducer element, the sidescan receive-only transducer element being configured to convert sound energy of the sonar returns into sidescan sonar return data in the form of electrical signals representative of the sound energy; and
processing, by a processor, the downscan sonar return data received from the linear downscan transmit/receive transducer element and the sidescan sonar return data received from the at least one sidescan transducer receive-only element to produce sonar image data for display to a user.

62. The method according to claim 61 further comprising:
transferring a transmit signal through transmitter circuitry in communication with the linear downscan transmit/receive transducer element to cause the linear downscan transmit/receive transducer element to transmit the sonar pulses;
transferring the downscan sonar data indicative of the sonar returns received by the linear downscan transmit/receive transducer element through a first receiver circuitry in communication with the linear downscan transmit/receive transducer element to the processor;
transferring the sidescan sonar data indicative of the sonar returns received by the at least one sidescan transducer receive only element through a second receiver circuitry in communication with the at least one sidescan transducer receive only element to the processor.

63. The method according to claim 61, wherein transmitting sonar pulses from the linear downscan transmit/receive transducer element comprises transmitting sonar pulses from a bottom surface and opposing side surfaces such that the fan-shaped beams formed from the respective sonar pulses produced from each of the bottom surface and opposing side surfaces of the linear downscan transmit/receive transducer element to provide substantially continuous sonar coverage from one side of the water craft to an opposite side of the water craft.

64. The method according to claim 61, wherein transmitting sonar pulses from the linear downscan transmit/receive transducer element comprises operating the linear downscan transmit/receive transducer element at a selected one of at least two selectable operating frequencies.

65. The method according to claim 64, wherein the selectable operating frequencies include about 455 kHz and about 800 kHz.

66. The method according to claim 61, wherein receiving sonar returns from the sonar pulses with the at least one sidescan receive-only transducer element comprises receiving sonar returns from the sonar pulses with a first sidescan receive-only transducer element and a second sidescan receive-only transducer element.

67. The method according to claim 61, wherein transmitting sonar pulses from the linear downscan transmit/receive transducer element comprises generating sonar pulses defining a fan-shaped beam extending from one side of the water craft to an opposite side of the water craft.

68. The method according to claim 61, wherein receiving sonar returns from the sonar pulses with the linear downscan transmit/receive transducer element comprises generating downscan sonar return data representing depth data.

69. The method according to claim 61, wherein receiving sonar returns from the sonar pulses with the linear downscan transmit/receive transducer element comprises generating downscan sonar return data representing water column data.

70. The method according to claim 61, wherein receiving sonar returns from the sonar pulses with the linear downscan transmit/receive transducer element comprises generating downscan sonar return data representing bottom data.

71. The method according to claim 61, wherein receiving sonar returns from the sonar pulses with the linear downscan transmit/receive transducer element comprises generating downscan sonar return data representing two or more of depth data, water column data, and bottom data.

72. The method according to claim 61, wherein receiving sonar returns from the sonar pulses with the linear downscan transmit/receive transducer element comprises generating downscan sonar return data representing data vertically below the linear downscan transmit/receive transducer element.

73. The method according to claim 61 further comprising presenting an image representing the sonar image data on a display.

74. The method according to claim 61, further comprising transmitting second sonar pulses from a circular transmit/receive transducer element positioned within the housing, and receiving second sonar returns from the second sonar pulses with the circular transmit/receive transducer element.

* * * * *